(12) United States Patent
Loo

(10) Patent No.: US 12,309,589 B2
(45) Date of Patent: May 20, 2025

(54) DETECTING UNAUTHORIZED TELECOMMUNICATION DEVICES AT A SECURED FACILITY

(71) Applicant: MDESS, LLC, Beavercreek, OH (US)

(72) Inventor: Garrett Loo, Carthage, NC (US)

(73) Assignee: MDESS, LLC, Beavercreek, OH (US)

( * ) Notice: Subject to any disclaimer, the term of this patent is extended or adjusted under 35 U.S.C. 154(b) by 0 days.

(21) Appl. No.: 18/487,002

(22) Filed: Oct. 13, 2023

(65) Prior Publication Data
US 2025/0113189 A1    Apr. 3, 2025

Related U.S. Application Data

(63) Continuation of application No. 18/479,612, filed on Oct. 2, 2023, now abandoned.

(51) Int. Cl.
| | | |
|---|---|---|
| *H04W 12/08* | (2021.01) | |
| *H04W 12/63* | (2021.01) | |
| *H04W 64/00* | (2009.01) | |

(52) U.S. Cl.
CPC .......... *H04W 12/08* (2013.01); *H04W 12/63* (2021.01); *H04W 64/006* (2013.01)

(58) Field of Classification Search
CPC .... H04W 12/08; H04W 12/63; H04W 64/006
See application file for complete search history.

(56) References Cited

U.S. PATENT DOCUMENTS

| | | | |
|---|---|---|---|
| 2009/0227255 A1* | 9/2009 | Thakare | H04W 48/10 455/434 |
| 2019/0035242 A1* | 1/2019 | Vazirani | G08B 13/19695 |
| 2019/0372951 A1* | 12/2019 | Satija | H04M 3/382 |
| 2022/0109983 A1* | 4/2022 | Barkam | H04W 4/38 |
| 2022/0400000 A1* | 12/2022 | Raj | H04W 12/06 |
| 2023/0047503 A1* | 2/2023 | Kim | H04W 60/00 |
| 2023/0083426 A1* | 3/2023 | Szigeti | G07C 9/00309 340/5.2 |
| 2023/0262420 A1* | 8/2023 | Behzadi | G06F 3/0383 455/457 |
| 2023/0284319 A1* | 9/2023 | Luo | H04W 48/18 370/329 |
| 2023/0351873 A1* | 11/2023 | Vazirani | G08B 29/188 |

(Continued)

*Primary Examiner* — Khawar Iqbal
(74) *Attorney, Agent, or Firm* — ARENTFOX SCHIFF LLP

(57) ABSTRACT

Aspects for identifying and locating contraband telecommunication devices are disclosed. In one such aspect, a system contains one or more base stations, and a processing system configured to identify wireless networks in a facility; obtain a transmission plan for detecting wireless devices at the facility; detect the wireless devices in the facility by executing the transmission plan on the identified wireless networks and free space in the facility; compare the detected wireless devices against a list of known authorized wireless devices to identify unauthorized devices; interrogate the identified potential unauthorized devices at multiple time intervals; extract at least an identifier for one of the identified potential unauthorized devices based on the results of the interrogation to identify at least one unauthorized device associated with the extracted identifier; and determine an estimated location of the identified unauthorized devices based on the results from the interrogation.

18 Claims, 13 Drawing Sheets

(56) References Cited

U.S. PATENT DOCUMENTS

| | | | | |
|---|---|---|---|---|
| 2023/0370452 A1* | 11/2023 | Mannengal | .............. | H04L 63/20 |
| 2023/0388783 A1* | 11/2023 | Edge | ..................... | H04W 12/06 |
| 2024/0022565 A1* | 1/2024 | Keith, Jr. | ............ | H04L 63/0861 |
| 2024/0031349 A1* | 1/2024 | Zacks | ..................... | G06F 21/31 |
| 2024/0054196 A1* | 2/2024 | Nainar | ................. | H04W 12/33 |
| 2024/0089846 A1* | 3/2024 | Munoz-Sanchez | ... | H04W 48/18 |

\* cited by examiner

DETECTING UNAUTHORIZED TELECOMMUNICATION DEVICES AT A SECURED FACILITY

CROSS-REFERENCE TO RELATED APPLICATIONS

This application is a continuation of U.S. patent application Ser. No. 18/479,612, filed on Oct. 2, 2023, the contents of which is incorporated herein by reference in its entirety.

BACKGROUND

Technical Field

The present disclosure generally relates to communication systems, and more particularly, to identification of contraband telecommunication devices.

INTRODUCTION

The use of contraband wireless devices, including mobile phones, tablets, etc., by users at a secured facility remains an ongoing problem. Sometimes these calls, texts or social media transmissions, etc., are innocuous policy violations at the facility. In other cases, the use of contraband wireless devices may constitute state or federal crimes. A significant number of calls and texts based on contraband devices, however, are more sinister. For example, in the context of correctional facilities, contraband wireless devices have been used by inmates to order the deaths of individuals in "hits", facilitate smuggling of controlled substances and weapons into the facility, set up means for escape attempts, initiate organized gang violence, etc.

Conventional attempts to address contraband devices include the secured facility include contracting a specialized firm to take up long-term or permanent residence at the secured facility. The contractor may include its own facility-specific telecommunications network and base station to regulate all voice and data transmissions to and from the facility. Ideally, the antennas and network components are positioned such that all communications, authorized or otherwise, are routed through this internal network to confirm they are legitimate. The internal network may block transmissions from suspicious or confirmed contraband devices, and may gather information from the transmissions for investigative purposes.

One problem with this implementation is the potentially exorbitant cost to the facility of running the internal network on a 24/7 basis. Another problem is the network itself. The antennas' transmissions can "bleed" out of the facility, inadvertently blocking legitimate transmissions from citizens that happen to be driving by the facility, for example. The opposite problem may occur where the antenna power is reduced to avoid bleeding but where the reduction is sufficient to enable contraband devices to access external base stations, and hence bypass the very protections put in place to prevent this activity.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Conventional solutions to identifying and locating contraband wireless devices include retaining a contractor firm to situate itself at the facility and set up a "managed access system" (MAS) including an intermediary wireless network having base stations, monitoring equipment, etc. For purposes of this disclosure, a MAS can include either a mobile or a fixed network, or a combination of both, including any cellular network for gathering relevant data. The base station's antennas are directed and powered to cover the facility grounds. Inmates may often attempt to possess and use contraband wireless devices including cellular telephones, disposable phones, and even tablets and personal computers (PCs) over the wireless network for voice calls, texts, instant messages, VoIP transmissions, and the like. Ideally, the MAS authorizes legitimate calls from pre-authorized phones, etc. and intercepts unauthorized transmissions. The MAS may include a central facility on the premises using servers to gather and process information about the unauthorized transmissions, to add devices to the contraband list, and to facilitate investigative efforts of the facility staff into related illegal activities.

This present solution can be prohibitively expensive. For one, the facility must be monitored on a 24/7 basis. The maintenance of the equipment and contracted staff likely burdens the allotted budgets of these facilities. Technical challenges also must be addressed. Examples include where the antennas from the base station at the facility inadvertently "bleed" to regions outside the facility. Otherwise legitimate calls may be intercepted or cut off. Similarly, the facility may include spotty regions where inmates can access external base stations using contraband devices. The problems are exacerbated in an urban environment, where the potential number of networks and individuals near the facility increase.

Aspects of the present disclosure overcome the above-stated problems and other shortcomings with this approach.

In an aspect of the disclosure, a method, system, and apparatus are provided. The method for identifying unauthorized wireless devices at a facility may include identifying wireless networks in a facility. The method may also include obtaining a transmission plan for detecting wireless devices at the facility, wherein the transmission plan comprises transmitting data, using a base station, on one or more wireless communication protocols, radio technologies, radio bands, or radio frequencies. The method may also include detecting the wireless devices in the facility by executing the transmission plan on the identified wireless networks and free space in the facility. The method may also include comparing the detected wireless devices against a list of known authorized wireless devices to identify one or more potential unauthorized devices. The method may also include interrogating the identified one or more potential unauthorized devices at multiple time intervals. The method may include extracting at least an identifier for one of the identified one or more potential unauthorized devices based on the results of the interrogation to identify at least one unauthorized device associated with the extracted identifier. The method further includes determining an estimated location of the identified unauthorized devices based on the results from the interrogation.

In another aspect of the disclosure, a system is provided. The system for identifying unauthorized wireless devices at a facility may include a memory configured to store identifying data of detected wireless devices, one or more base stations located in the facility, a processing system, and a housing that encompasses the memory and the processing system to prevent tampering. The processing system may be configured to identify wireless networks in a facility, obtain a transmission plan for detecting wireless devices at the facility, wherein the transmission plan comprises transmitting data, using a base station, on one or more wireless communication protocols, radio technologies, radio bands, or radio frequencies, detect the wireless devices in the facility by executing the transmission plan on the identified wireless networks and free space in the facility, compare the detected wireless devices against a list of known authorized wireless devices to identify one or more potential unauthorized devices, interrogate the identified one or more potential unauthorized devices at multiple time intervals, extract at least an identifier for one of the identified one or more potential unauthorized devices based on the results of the interrogation to identify at least one unauthorized device associated with the extracted identifier, and determine an estimated location of the identified unauthorized devices based on the results from the interrogation.

In still another aspect of the disclosure, an apparatus is provided. The apparatus for identifying unauthorized wireless devices at a facility may include a memory configured to store identifying data of detected wireless devices, one or more base stations located in the facility, a processing system, and a housing that encompasses the memory and the processing system to prevent tampering. The processing system may be configured to identify wireless networks in a facility, obtain a transmission plan for detecting wireless devices at the facility, wherein the transmission plan comprises transmitting data, using a base station, on one or more wireless communication protocols, radio technologies, radio bands, or radio frequencies, detect the wireless devices in the facility by executing the transmission plan on the identified wireless networks and free space in the facility, compare the detected wireless devices against a list of known authorized wireless devices to identify one or more potential unauthorized devices, interrogate the identified one or more potential unauthorized devices at multiple time intervals, extract at least an identifier for one of the identified one or more potential unauthorized devices based on the results of the interrogation to identify at least one unauthorized device associated with the extracted identifier, and determine an estimated location of the identified unauthorized devices based on the results from the interrogation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
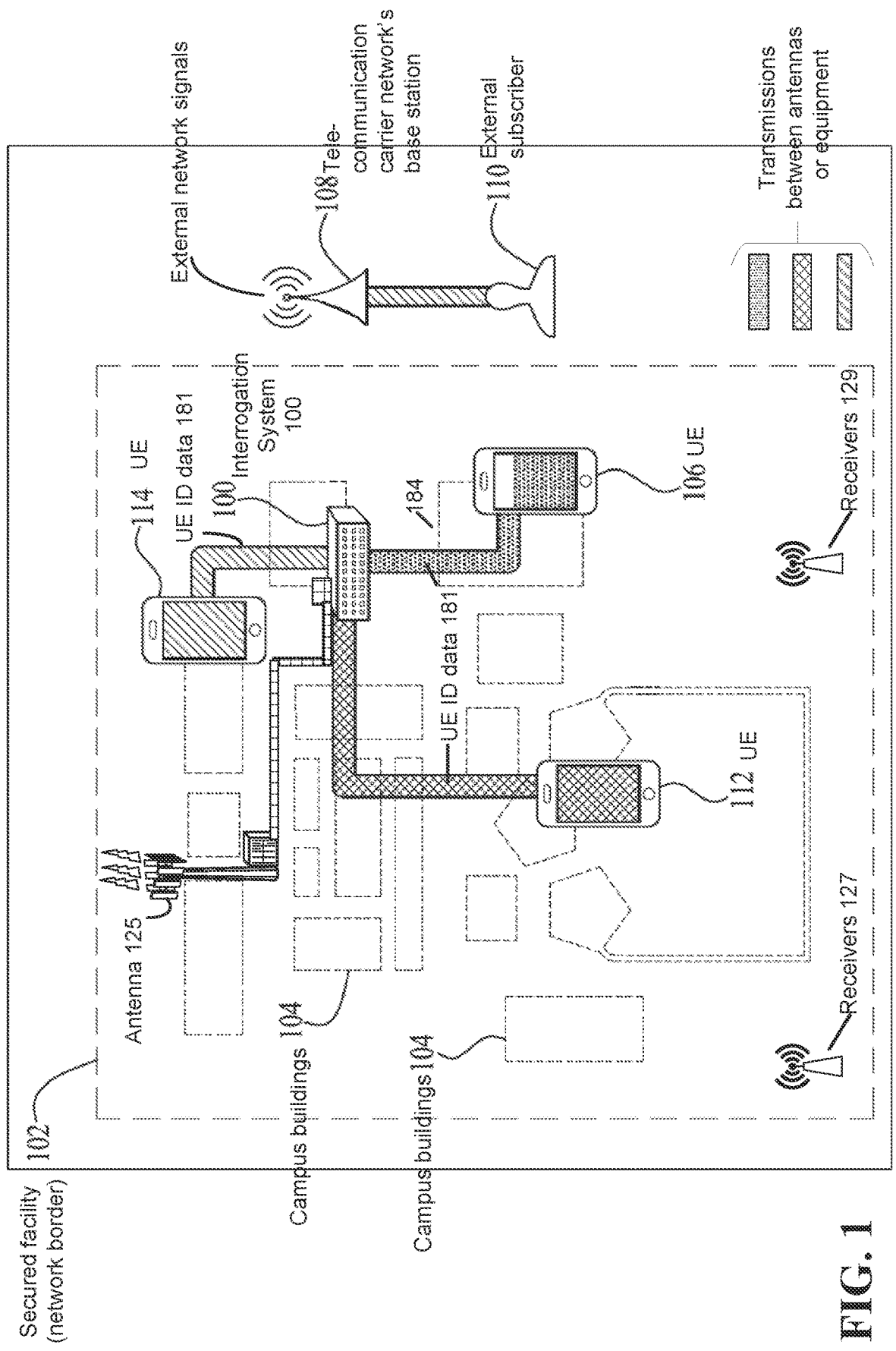
FIG. 1 is a diagram illustrating an example of a detection device that may be used at a secured facility for detecting contraband user equipment according to an embodiment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), Software defined Radio (SDR), Power Amplifiers (PA), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

As used herein, the terms "telecommunication carrier devices," "wireless devices", "user equipment" (UE), and "base station" are not intended to be specific or otherwise limited to any particular Radio Access Technology (RAT), unless otherwise noted. In general, a telecommunication carrier device, wireless device, or UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle, Internet of Things (IoT) device, etc.) used by a user to communicate over a wireless communication network. A UE may be mobile or may (e.g., at certain times) be stationary, and may communicate with a Radio Access Network (RAN). As used herein, the terms "telecommunication carrier device," "wireless terminal", or "UE" may be referred to interchangeably as an "access terminal" or "AT", a "client device", a "wireless device," a "subscriber device," a "subscriber terminal", a "subscriber station," a "user terminal," a "mobile terminal," a "mobile station", or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may alternatively referred to as an access point (AP), a network node, a NodeB, an evolved NodeB (eNB), a New Radio (NR) Node B (also referred to as gNB or gNodeB), etc. In addition, in some systems, a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.).

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Various aspects of the present disclosure describe identifying and detecting an estimated location of contraband wireless devices at a secured facility such as an inmate correctional facility, school, hospital, or classified laboratory. Conventional techniques rely on a contracting firm placing a permanent network at the correctional facility. A base station and related server system is established as part of a managed access system (MAS). One significant disadvantage with this approach is the potentially exorbitant expense to the facility to have a permanent firm performing this cellular contraband regulation 24 hours a day, seven days a week for a possibly indefinite period. Additional shortcomings relate to the problems that occur when the network inadvertently "bleeds" into the surrounding area, resulting in civilians' cellular equipment being affected by the prison network. If the contracting firm attempts to fix this problem (particularly in an urban environment involving other base stations in the proximity of the facility) by reducing the transmission and receive power of the on-site base station(s), then it may become possible for inmates to reach external base stations using contraband phones. The inmates may then altogether bypass the restrictions in place.

According to one aspect of the disclosure, an interrogation system may emulate a base station and be temporarily placed into a secured facility for a period of time to identify and detect locations of UEs (e.g., authorized and unauthorized wireless devices). In the aspects disclosed herein, once the interrogation system is dispatched in the secured facility, the interrogation system may broadcast a signal through all different carriers, RANs, and RATs to identify all wireless devices. The interrogation system may compare the identified wireless devices against a list of known authorized devices to identify potential contraband devices. Once the potential contraband devices are identified, the interrogation system interrogates the potential contraband devices for identifiers in order to estimate a location of the potential contraband device using lower layer information. Other equipment such as multiple receivers may also be placed around the secured facility to help triangulate the position of potential contraband device. In addition, as described below, various sources of third party data may be provided to users of the interrogation system and used in connection with making determination whether devices are contraband.

Because the interrogation system identifies all wireless networks in the secured facility and then sweeps through all different possibilities of frequencies, technologies, and protocols in an area of interest, all wireless devices within the area of interest may be identified with zero manpower. In addition, determining a location of identified wireless devices within the area of interest using bursts of interrogation techniques also allows a contractor to identify patterns and behaviors of devices. This eliminates the need for a contractor to actively monitor and detect wireless devices, as in conventional solutions. This may result in a large cost savings to the secured facility. Also, the concerns of "bleeding" spurious, interfering transmissions outside the facility may largely eliminated, since the contractor no longer has a need for a base station at the facility.

It should be noted that, while the entity managing the data collection and subsequent duties is referenced herein as a "contractor" or "contracting firm" purely for convenience, this reference is not intended to have any legal significance, and is not intended to limit the disclosure in any way. Thus, for example, the contractor need not be contracted by the carrier to perform the activities herein.

FIG. 1 is a diagram illustrating an example of an interrogation system 100 that may be set up at a secured facility 102 by the contractor during a detection period to locate potential contraband wireless devices within the secured facility 102. The secured facility 102 may be divided by the contractor into a secured facility network border which encompasses the grounds of the facility and which is also used for establishing the size and geometrical area of the network to be used by the contractor for data collection. The purpose of the interrogation system 100 is to identify all user equipment (UEs, or wireless devices) on different carriers within the border of the facility and then continuously interrogate unknown wireless devices to identify the wireless device. The identifiers from the wireless devices identified as contraband can then be used to derive an estimated location of the wireless devices.

It should be noted that FIG. 1 is not drawn to scale. Rather, its components are minimized to avoid unduly obscuring the concepts of the disclosure. For example, while the interrogation system 100 appears in FIG. 1 to be physically adjacent to the network border of the secured facility 102 and hence the external base station 108 of the neighboring telecommunication carrier (e.g., AT&T, Verizon, etc.), it is nonetheless assumed for purposes of this example that the base station in the interrogation system 100 has the power and direction of antenna 125 steered appropriately to cover the network within the secured facility, without appreciable (if any) bleeding to regions outside the network border of the correctional facility.

In some examples, the interrogation system 100 be strategically placed in areas of the secured facility such as an area where a specific housing unit is only in a single direction in order to isolate the location of the identified wireless devices within the specific housing unit. In some examples, the interrogation system 100 may be mobile or portable (i.e., capable of being moved through different geographical positions). In some examples, the interrogation system 100 may be immobile, or a fixed transceiver. The interrogation system 100 may also communicate with receivers 127, 129 that are located throughout the secured facility 102 to listen for communication signals from the wireless devices and triangulate with the other receivers to help refine the location of the wireless devices. These receivers 127, 129 may be connected to the interrogation system 100 through a wired connection or wirelessly. In some examples, the receivers 127, 129 may be wired or wireless power meters that send information back to the interrogation system 100.

In some examples, an interrogation system 100 comprises an interrogation device that is configured to imitate the operation of a base station, and to solicit wireless devices to establish temporary communication in order to monitor and track them.

In some examples, the interrogation system 100 may include a memory configured to store identifying data of detected wireless devices, one or more base stations (e.g., transmitter-receiver) and one or more antennas, a processing system to emulate a base station to transmit a signal to wireless devices and to carry out various computation functions of the system, and a housing that encompasses the device to prevent tampering or sabotage. The one or more base stations typically carries out the various transmission and reception functions of the interrogation system 100. The processing system carries out various computation functions of the system 100.

In some examples, the interrogation system 100 may contain an interior antenna. In examples where the interrogation system 100 contains internal antennas, the interrogation system 100 may need to have radio frequency transparent material in order to transmit signal out of the device or an RF pathway to allow the internal antennas to transmit signals. In other examples, the interrogation system 100 may contain an exterior antenna 125 such that the exterior antenna 125 is outside of the housing.

Transmit beamforming is a technique for focusing an RF signal in a specific direction. Traditionally, when a network node (e.g., a base station of the interrogation system 100) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In some examples, the base station may be coupled via a backhaul connection 184 to additional network equipment, including server and gateway. The server and gateway may be included, for example, within a temporary room implemented in one of the campus buildings 104 on the facility.

In some examples, the interrogation system 100 may be electrically and physically tamperproof. Since the interrogation system 100 is deployed in a secured facility such as correctional facility, the interrogation system 100 should be ruggedized and tamperproof to prevent the interrogation system from being sabotaged or detected. For instance, the interrogation system 100 may contain tamperproof screws and/or have screwing mechanisms made out of titanium or stainless steel. In some examples, the interior of the interrogation system may be constructed out of aluminum and the exterior box may be made out of a black polycarbonate.

In the arrangement of FIG. 1, the interrogation system 100, and all the other optional network equipment may be implemented by the contractor that is performing the detection. The interrogation system 100 may be equipment belonging to the contractor, which ideally can be brought into the secured facility on a temporary basis and easily set up in an efficient manner for temporary use at the secured facility 102.

Data collection during interrogation. The raw data collected by the interrogation system 100 from the transmitting UEs may include metadata included with various message. Other relevant identifying data that may be transmitted from different wireless devices includes IMSI (International mobile subscriber identity), IMEI (International mobile equipment identity), GUTI (Globally unique temporary ID), SMS (Short message service), and other relevant data not limited to this list.

The data initially collected by the interrogation system 100 after interrogation may include data originating from the signaling layer. This signal layer information includes identifying information of the wireless devices, the location of the system (i.e., the location within the facility from which or to which the inmates are transmitting) the received signal strength indicator (RSSI) of the transmitted signals, etc. Additional relevant data includes the location from where the base station of the interrogation system 100 was transmitting, the time and data stamps of the communications, geolocation information, the direction of the transmission, the type of antenna being used, the beamwidth of the signal, round trip time (RTT) for transmissions to and from designated points, chip rates of the transmission, etc. This data from the wireless device may be used to derive an estimated location of the wireless device from the interrogation system 100.

The secured facility 102 may include within its border a number of telecommunication carrier devices or UEs (e.g., 106, 112, and 114) that may be powered on and even operational at one or more times during the expected detection period. Each of these UEs may be transmitting UE ID data 181 in various forms which can include the raw data, or other data types, identified above. The contractor may receive additional information from third party sources that may assist in heightening or lowering the respective levels of confidence of the various UEs. The contractor may have received as noted above data from the secured facility, or from the Department of Corrections (DOC) that may include details such as an identification of authorized device's (e.g., the warden's, guard's, and staff's wireless devices, etc.). Third party data may also be received regarding suspicious devices.

After the identified data has been collected and the contractor's responsibilities have concluded, the data may be returned to another location. The other location may be any location, but in one embodiment, the identified location may be where the contractor's facility resides. For example, the identified data may be routed to the contractor's facility over a secure network connection in or near real time. In other embodiments, it may be stored in a cloud and subsequently transferred to the contractor's facility. In still other embodiments, the identified data may be secured in flash memory or redundant memory arrays at the secured facility, with the memory being transported at the conclusion of the analyses at the secured facility to the contractor's facilities. In some embodiments, the secured facilities may be located at the correctional facility itself.

The memory may, for example, be a data repository including one or more non-volatile memory devices. In some examples, the contractor's location may include a server. The server may include the processing system and the memory. The processing system may include a user interface to enable one or more users (e.g., data analysts, investigators, etc.) to retrieve data from the connected memory, and to study the historical data and manipulate it as necessary. Based on a number of different criteria, such as the list of approved wireless devices (e.g., used by guards and prison personnel) provided by the correctional facility and in some embodiments, the lists of inmate-specific authorized individuals (that is, the list of people that are allowed to have a wireless device), and other criteria described herein, the processing system may whether the wireless device is contraband.

Figure 2:
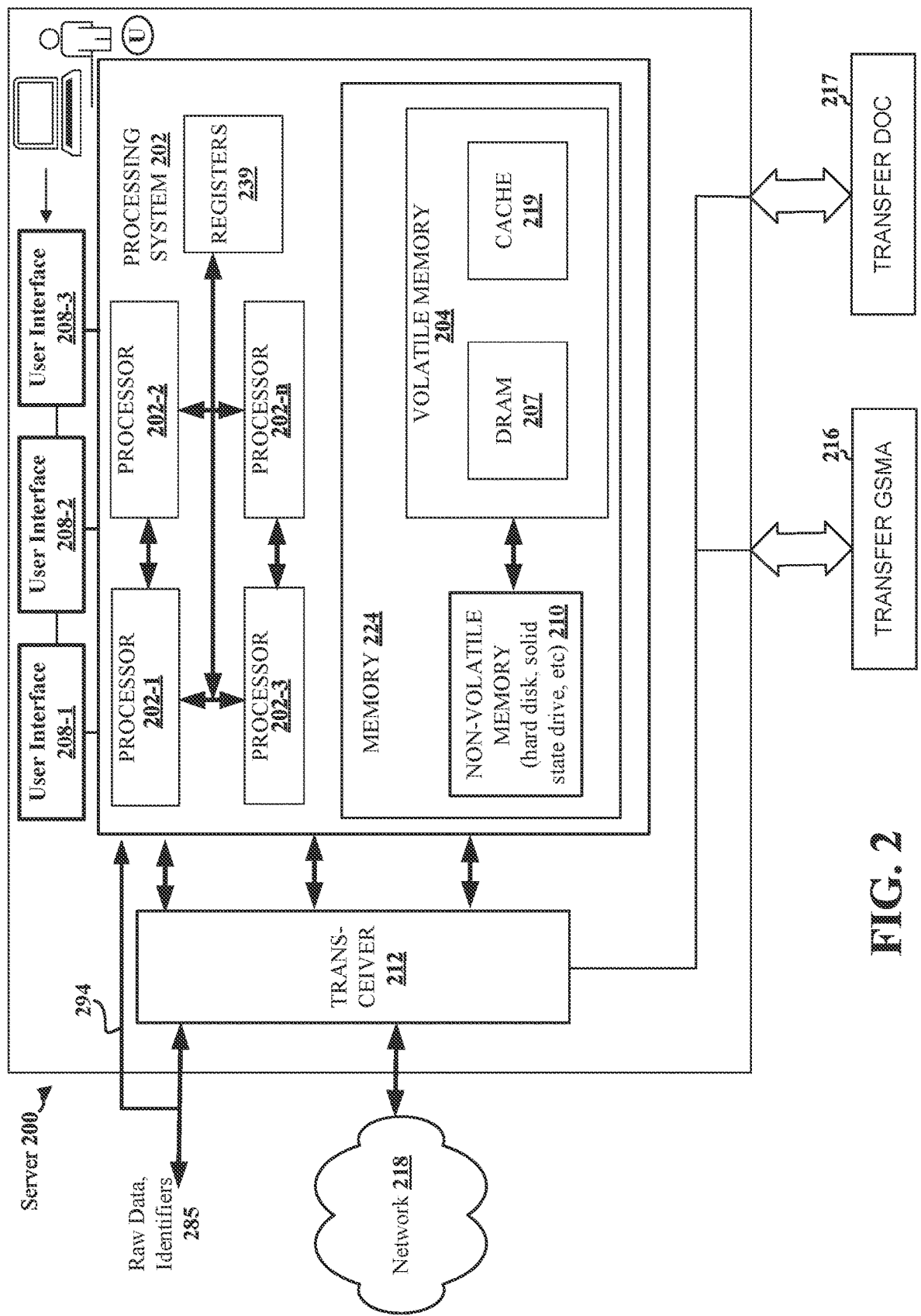
FIG. 2 is a block diagram of a server used for processing data retrieved from a secured facility according to an embodiment.

FIG. 2 is a block diagram of a server 200 used for processing data retrieved from a secured facility. The server 200 may include a processing system 202. The processing system may include one or more processors 202-1-202.n. Examples of processors 202-1 may include those types of processors specified above, among others. Each of processors 202-1, 202-2, 202-3 through 202-n in the processing system 202 may execute code from registers 239. Registers 239 may be arranged in any logical way, with more than one rows or columns to accommodate multiple contemporaneous operations, etc.

In some embodiments, one or more, or all, of the registers 239 may be included in memory 224. Memory 224 may include computer-readable media such as non-volatile memory (NVM) 210. The NVM 210 may include flash memory, hard disks, solid state disk drives, and the like. Memory 224 may also include volatile memory 204, including dynamic RAM 207 used to store high speed applications when the server 200 is performing intense computation using multiple suites of software, for example. Volatile memory 204 may include cache memory 219, which may be one or more levels of the different processors' most recently used information, and which may be used by processors 202-1-202-n for fast access to the data.

In some embodiments, the memory 224 is deemed to be included with the processing system 202. However, these systems are identical to systems in which the processing system and memory are configured to be different components. For example, FIG. 2 broadly shows a system including a processing system and a memory (and other components). This is equivalent to a system that includes a processing system and a memory, regardless of whether the memory is illustrated to be part of the processing system.

Server 200 further includes a transceiver 212 coupled to the processing system 202 for transmitting and receiving data to network 218 which may, for example, be part of the Internet. In some embodiments, the server 200 belongs to the contractor, and the data collected during the contractor's visit to the facility is stored in the memory 224 (for example, in a database in NVM 210). In some embodiments, the data collected is transported over a secure channel on the network (e.g., streamed in or near real time, or streamed subsequently on demand, or sent via one or more files. The collected data may also be physical transported to the server 200, e.g., using one or more solid-state drives (SSDs), thumb drives, flash drives, or other structures. The data is input into the memory 224, whether directly via input 294 or through transceiver 212 via 285. Processing system 202 may include user interfaces (UIs) 208-1, 208-2, and 208-3, such that the data in the processing system 202 and memory 224 can be readily accessed and manipulated in any form of client-server relationship, e.g. by one or more corresponding user(s) "U" or natively. Thus, the processing system 202 may, but need not, be implemented in a traditional server.

FIG. 2 also shows a transceiver interface "transfer GSMA" 216. This specialized interface, which may in some embodiments be part of transceiver 212. The Groupe Speciale Mobile Association (GSMA) is an association representing the interests of mobile operators and the mobile industry worldwide. Its members include mobile operators, handset and device manufacturers, software companies, mobile hardware providers and Internet companies. GSMA is standardized worldwide. Among numerous other responsibilities, the GSMA overlooks public policy and device security in connection with mobile networks. For example, the GSMA may maintain a database of phones that have certain categories such as lost, stolen, and in some cases contraband. The GSMA may also delegate these activities to other entities, such as by retaining or contracting third parties to maintain such databases. Carriers generally maintain a database of phone identifications that are lost, stolen, or otherwise unauthorized. In short, GSMA specifications indicate to the relevant carrier that a list of phones that were once subscribers of that carrier should no longer be used. Theft and loss of the device are similar to prison contraband in this respect. Accordingly, when GSMA or the designated entity receives authorized information validating that specific wireless devices are contraband, the GSMA or entity may provide this data to the applicable carrier. The carrier receives the information and thus blocks access by a corresponding telecommunication device to the network. For purposes of this disclosure, references to the GSMA may also include a designee, entity, or contractor that the GSMA may retain or otherwise engage to perform a particular task.

Part of the process of blocking cellular use on a carrier-level includes transferring data to the GSMA, which in various embodiments shown in GSMA 216 can be performed in an automated fashion using the I/O component GSMA 216. In other embodiments, a user may just send, mail or e-mail the necessary documents or files to the GSMA.

A similar I/O device or port, "Transfer DOC" 217 refers to embodiments involving an automated process of notifying the Department of Corrections (DOC) that certain actions relating to blocking phones have been performed. In addition, one requirement to block such phones is for the contractor to acquire ownership of the contraband devices. Thus, the DOC may authorize the actions of the contractor, GSMA and carrier by transferring ownership or title of the contraband phones to the contractor, thereby authorizing the contractor to proceed with the GSMA. In other embodiments, these DOC documents and activities are performed manually or by mail or e-mail, as directed.

Figure 3:
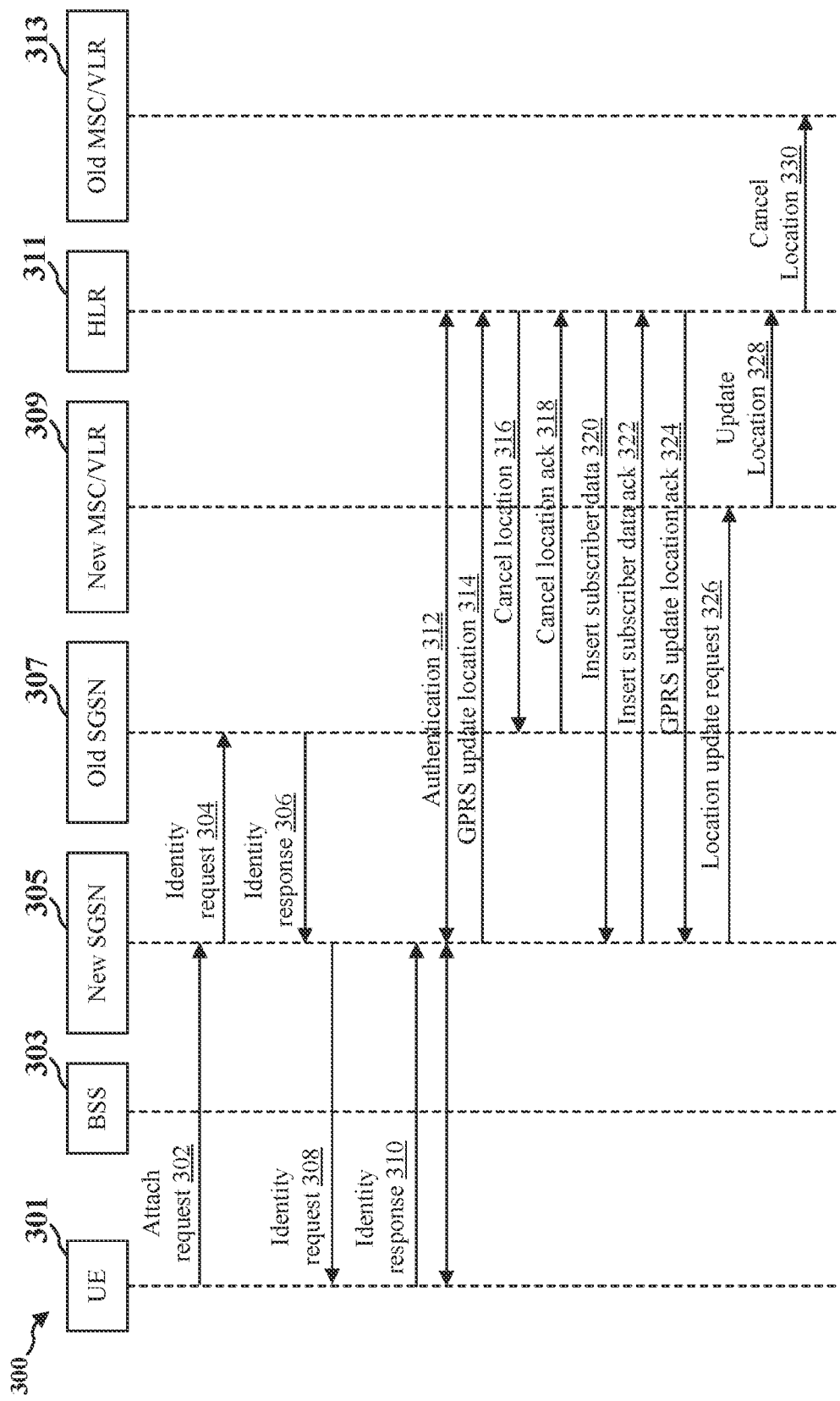
FIG. 3 is a call flow diagram of an example negotiation method between a wireless device and an interrogation system according to an embodiment.

FIG. 3 is a call flow diagram of an example negotiation method between a wireless device and an interrogation system according to an embodiment. Specifically, example 300 from FIG. 3 shows an interrogation process for a wireless device by using a General Packet Radio Services (GPRS) attach process.

When a UE has been enticed to register with an interrogation system, the UE may be interrogated. Many interrogation techniques can be derived directly from a reading of the cellular standard. In the case of Global System for Mobile communication (GSM), Universal Mobile Telecommunications Systems (UMTS), fourth generation long-term evolution (4G/LTE), fifth generation New Radio (NR), and 6G wireless device, the International Standard Mobile Identifier (IMSI), the Temporary Mobile Standard Identifier (TMSI), and the equipment electronic serial number (IMEI), the LTE Globally Unique Temporary ID GUTI, Subscription Concealed Identifier (SUCI) can be queried. For example, GUTI comprises of two main components, Globally Unique Mobility Management Entity Identifier (GUMMEI), which uniquely identifies a MME, and Mobile Temporary Mobile Subscriber Identity (M-TMSI), which identifies a user. As another example, SUCI is a unique identifier designed to protect the privacy of the subscriber's identity and is generated by the UE using an Elliptic Curve Integrated Encryption Scheme (ECIES)-based protection scheme.

Example 300 shows an GPRS Attach procedure by which a UE registers (e.g., connects) to the GPRS network. During the GPRS Attach procedure, when the UE makes an attach procedure for the first time, the UE will identify itself to the network using an IMSI. In other words, the GPRS Attach procedure enables the network (e.g., interrogation system 100 from FIG. 1) to know about the existence of a UE 301.

At step 302, the UE 301 sends an attach request message to the new SGSN 305. In some examples, the UE 301 will send its IMSI to identify itself.

At step 304, the new SGSN 305 queries the old SGSN 307 for the identity of the handset. At step 306, the old SGSN 307 responds with the identity of the handset.

At step 308, the new SGSN 305 requests more information from the UE 301. At step 310, this information is used to authenticate the UE 301 to the new SGSN 305.

At step 312, the authentication process occurs between the new SGSN 305 and the UE 301 and continues to the HLR 311. The HLR 311 acts like a RADIUS server using a handset-level authentication based on IMSI and similar to the CHAP authentication process in PPP.

At step 314, the new SGSN 305 sends a update location to the HLR 311 indicating the change of location to a new SGSN 305. Here, the new SGSN 305 sends its own SGSN address to the HLR 311. The HLR 311 should always know which SGSN is currently serving the UE 301.

At step 316, the HLR 311 notifies the old SGSN 307 to cancel the location process for the UE 301.

At step 318, the old SGSN 307 sends a cancel location acknowledgement to the HLR 311.

At step 320, the HLR 311 sends subscription data to the new SGSN 305 by sending an insert subscriber data request and other information associated with this UE 301. Here, the new SGSN 305 receives the UE subscription data from the HLR 311 and stores it in its mobility management (MM) context.

At step 322, the new SGSN 305 replies with an insert subscriber data acknowledgement to the HLR 311.

At step 324, the HLR 311 notifies the new SGSN 305 that the update location has been performed.

At step 326, the new SGSN 305 initiates a location update request to the VLR 309.

At step 328, the VLR acts like a proxy RADIUS that queries the home HLR 311.

At step 330, the HLR 311 notifies the old MSC/VLR 313 to cancel the location process for the UE 301.

After completing the process of GPRS attach, an MM context will be active at the UE 301 and the new SGSN 305. Here, the MM context stores the information of the UE 301. More importantly, the network has identified the user through its IMSI, and also authenticated it. The new SGSN 305 also may know the subscription information and the serving location of the UE 301.

Figure 4:
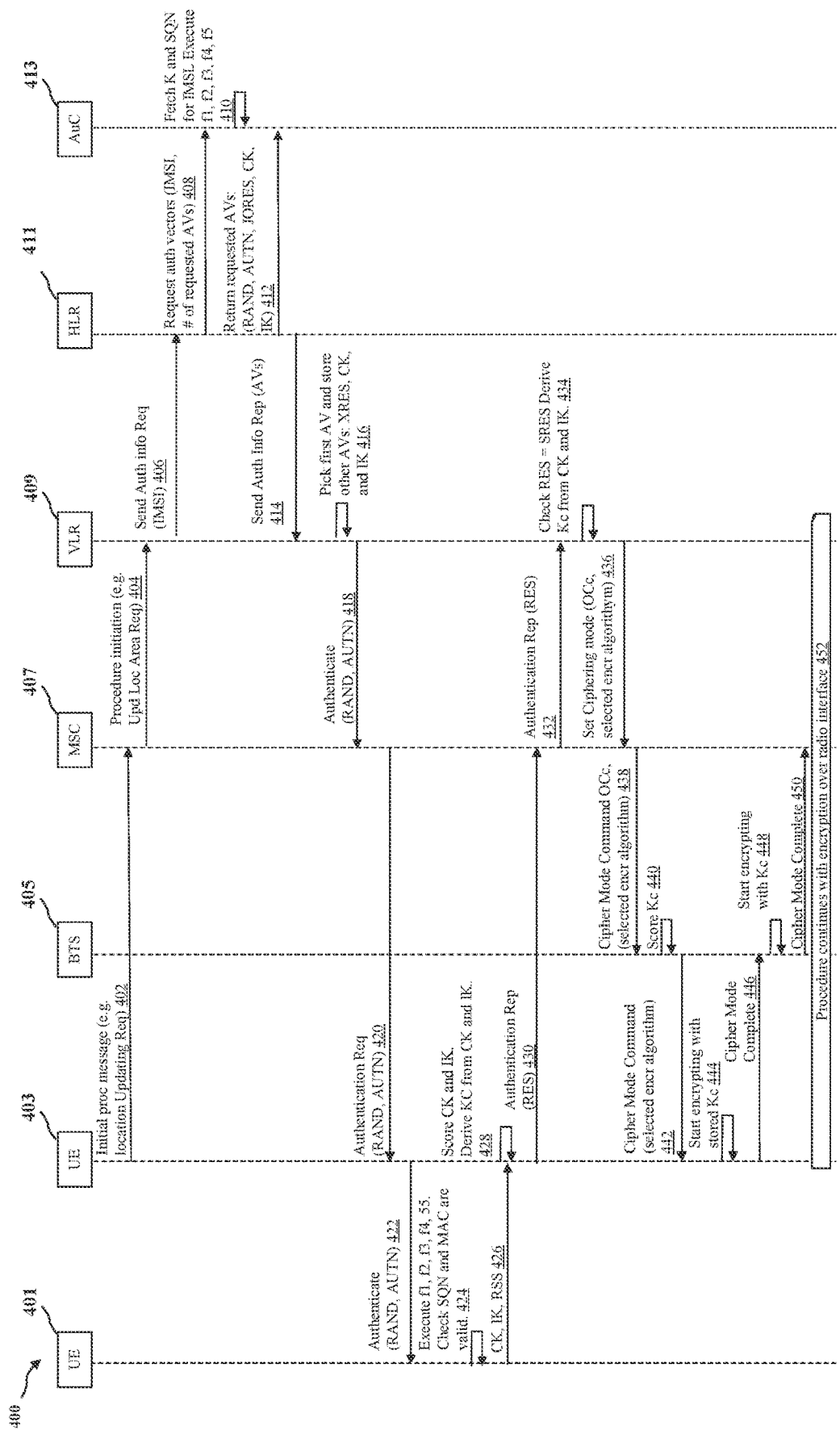
FIG. 4 is a call flow diagram of an example negotiation method between a wireless device and an interrogation system according to an embodiment.

FIG. 4 is a call flow diagram of an example negotiation method between a wireless device and an interrogation system according to an embodiment. Specifically, example 400 from FIG. 4 shows an interrogation process for a wireless device using a 3G authentication process.

At step 402, the UE 403 initiates a procedure by sending an initial message to the network. For example, the initial message may be a Location Updating Request to initiate CS attachment. Data traffic transmitted over the radio interface is currently sent in the clear.

At step 404, the MSC 407 receives the UE message and initiates the appropriate procedure with the VLR 409 (e.g., Update Location Area).

At step 406, VLR 409 decides to authenticate the subscriber by sending a Send Authentication Info Request to the HLR 411 along with the IMSI of the subscriber.

At step 408, the HLR 411 requests the AuC 413 for one or more authentication vectors (AVs), supplying the IMSI.

At step 410, the AuC 413 retrieves the secret key K and authentication sequence number SQN associated with the IMSI. For each requested AV, the AuC 413 generates a random challenge RAND and executes f1, f2, f3, f4, and f5 resulting in as many [MAC, XRES, CK, IK, AK] result values. The SQN value is obfuscated with the anonymity key AK through an XOR operation. The AMF and the MAC are concatenated to this obfuscated to form an Authentication token named AUTN.

At step 412, the AuC 413 returns a list of [RAND, AUTN, CK, IK, XRES] Avs to the HLR 411.

At step 414, the HLR 411 returns the first authentication vector AV to the VLR 409 in a Send Authentication Info Response message.

At step 416, the VLR 409 stores the XRES, CK, and IK for later use.

At step 418, the VLR 409 requests the MSC 407 to authenticate the subscriber. The VLR 409 supplies the RAND and the AUTN.

At step 420, the MSC 407 sends an Authentication Request to the UE 403, supplying the RAND and AUTN.

At step 422, the UE 403 invokes the AUTHENTICATE program on the SIM 401, supplying the RAND and AUTN.

At step 424, the SIM 401 executes f1, f2, f3, f4, and f5 supplying the RAND, AMF (extracted from AUTN), its stored SQN and secret key K. This returns [MAC, RES, CK, IK, AK. The SIM 401 then calculates SQN XOR AK and verifies that the value matches the value in the AUTN. It also checks that the calculated MAC matches the MAC extracted from the AUTN token.

At step 426, the SIM 401 returns the generated CK, IK, and RES values to the UE 403.

At step 428, the UE 403 stores the CK and IK and, because the procedure is over GSM, derives a Kc from these two values.

At step 430, the UE 403 sends back an Authentication Response to the MSC 407 with the calculated RES.

At step 432, the MSC 407 responds to the VLR authentication response, supplying the RES returned by the UE 403.

At step 434, the VLR 409 verifies that RES=SRES. If this check is verified, then the SIM 401 is storing the same Ki as in the AuC 413 and, therefore, the subscriber is authenticated. It derives a Kc from the stored CK and IK.

At step 436, the VLR 409 can now use the stored KC to request the BTS/UE 403 to start encrypting all traffic exchanged over the radio interface. It does so by sending a Set Ciphering Mode message to the MSC 407, supplying the Kc and a chosen encryption algorithms supported by the BTS 405 and the UE 403.

At step 438, the MSC 407 requests the BTS 405 and the UE 403 to start ciphering by sending a Ciphering Mode Command. The Kc and encryption algorithm is supplied.

At step 440, the BTS 405 stores the Kc for later use.

At step 442, the BTS 405 sends the Ciphering Mode Command to the UE 403 with the selected encryption algorithm.

At step 444, the UE 403 activates encryption on the logical channel using the stored KC as ciphering key.

At step 446, the UE 403 sends a Ciphering Mode Complete back to the BTS 405.

At step 448, the BTS 405 starts encryption on the logical channel using the stored KC.

At step 450, the BTS 405 forwards the Ciphering Mode Complete to the MSC 407.

At step 452, all traffic sent in both directions over the radio link is now encrypted.

Figure 5:
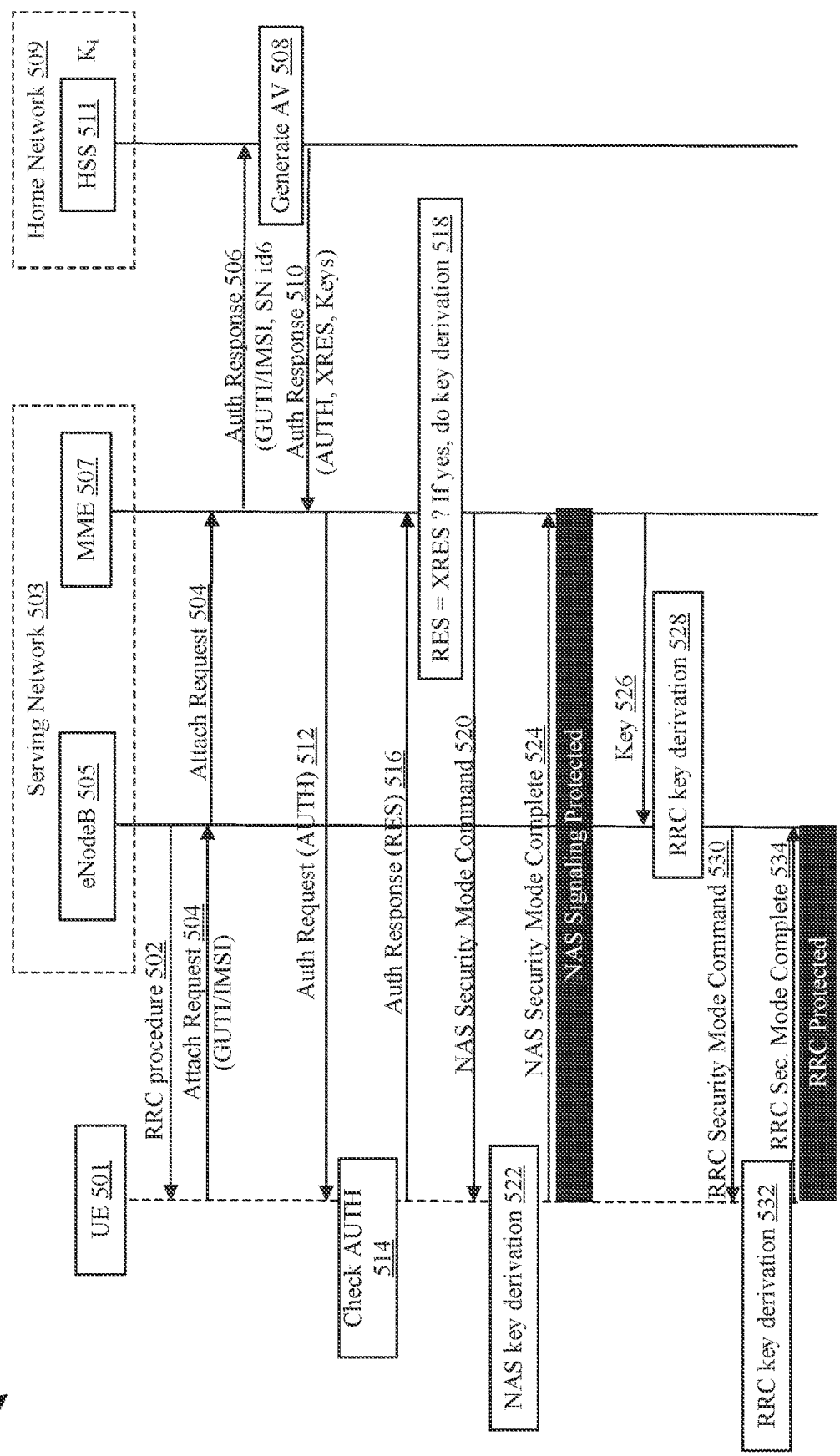
FIG. 5 is a call flow diagram of an example negotiation method between a wireless device and an interrogation system according to an embodiment.

FIG. 5 is a call flow diagram of an example negotiation method between a wireless device and an interrogation system according to an embodiment. Specifically, example 500 from FIG. 5 shows an interrogation process for a wireless device using a LTE authentication procedure.

At step 502, the EPS-AKA is triggered after the UE 501 completes the RRC procedure with eNodeB 505

At step 504, the UE 501 sends an Attach Request to the MME 507.

At step 506, the MME 507 sends an Authentication Request, including the UE identity (i.e., IMSI) and the serving network identifier, to the HSS 511 located in the home network 509.

At step 508, the HSS 511 performs cryptographic operations based on the shared secret key, Ki (shared with the UE 501), to derive one or more authentication vectors (AVs). The AV consists of an authentication (AUTH) token and an expected response (XAUTH) token, among other data.

At step 510, the HSS sends the shared secret key back to the MME in an Authentication Response message.

At step 512, after receiving an Authentication Response Message from the HSS 511, the MME 507 sends an Authentication Request to the UE 501, including the AUTH token.

At step 514, the UE 501 validates the AUTH token by comparing it to a generated token based on Ki.

At step 516, if the validation succeeds, the UE 501 considers the network to be legitimate and sends an Authentication Response message including a response (RES) token, which is also generated based on Ki, back to the MME 507.

At step 518, the MME 507 compares the RES token with an expected response (XRES) token. If they are equal, the MME 507 performs key derivation.

At step 520, the MME 507 sends a Security Mode Command message to the UE 501.

At step 522, the UE 501 derives the corresponding keys for protecting subsequent NAS signaling messages.

At step 524, the UE 501 sends a Security Mode Command complete message to the MME 507.

At step 526, the MME 507 will send the eNodeB 505 a key.

At step 528, the eNodeB 505 derives the keys for protecting the RRC channel based on the key sent from eNodeB 505.

At step 530, the eNodeB 505 sends a Security Mode Command message to the UE 501.

At step 532, the UE 501 derives the corresponding keys.

At step 534, the UE 501 sends a Security Mode Complete message to the eNodeB 505 and subsequent communication between the UE 501 and the eNodeB 505 are protected.

Figure 6:
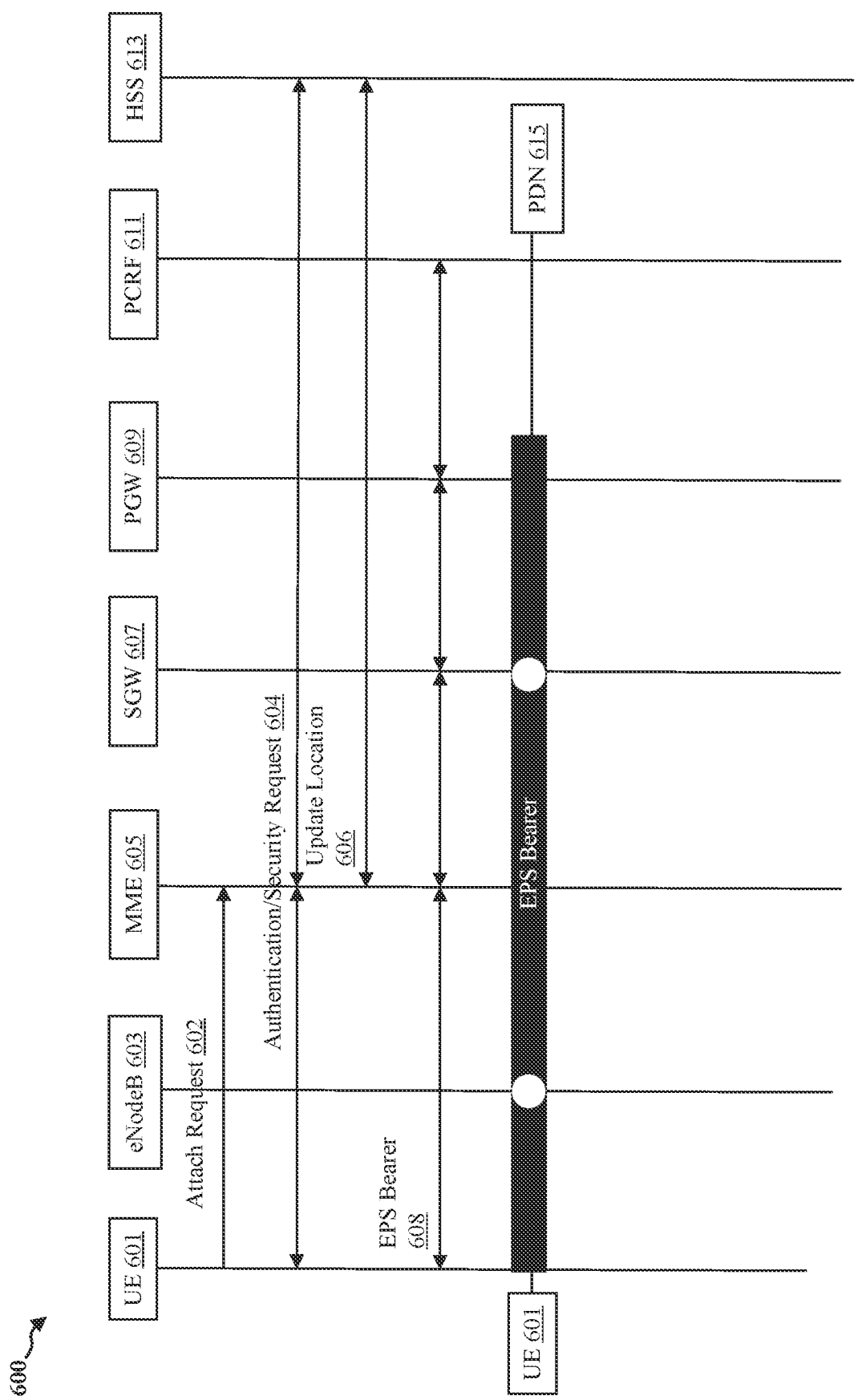
FIG. 6 is a call flow diagram of an example negotiation method between a wireless device and an interrogation system according to an embodiment.

FIG. 6 is a call flow diagram of an example negotiation method between a wireless device and an interrogation system according to an embodiment. Specifically, example 600 from FIG. 6 shows an interrogation process for a wireless device using a LTE Attach Procedure.

The goal of the Attach Procedure is to register a UE 601 to the network such that the UE 601 is able to send and receive data to and from the PDN 615

At step 602, the UE 601 sends an "Attach Request" to the MME 605. This includes the GUTI of the UE 601 of the UE received from the last attach, and the APN that the UE would like to connect to.

At step 604, the MME 605 performs authentication and security for the UE 601 in order to authenticate the UE 601 and to secure the messages exchanged between the MME 605 and the UE 601. A non-Access Stratum (NAS) messages security may be established between the UE 601 and the MME 605.

At step 606, the MME 605 sends an "update location request" to the HSS 613, which includes the MME ID of the MME 605. This is done because the HSS 613 should always know which MME 605 is currently serving the UE 601. In addition, the HSS 613 provides the MME 605 with UE subscription information, including the PDNs that the UE 601 is allowed to access.

At step 608, the EPS Bearer will be established between the UE 601 and the PGW 609 through the eNodeB 603 and the SGW 607. The data sent and received through the UE 601 and the PDN 615 will be passed through the EPS Bearer.

After the LTE Attach Procedure ends, the MME 605 assigns the UE 601 a GUTI and an EPS Bearer should be created between the UE 601 and the PGW 609.

Figure 7:
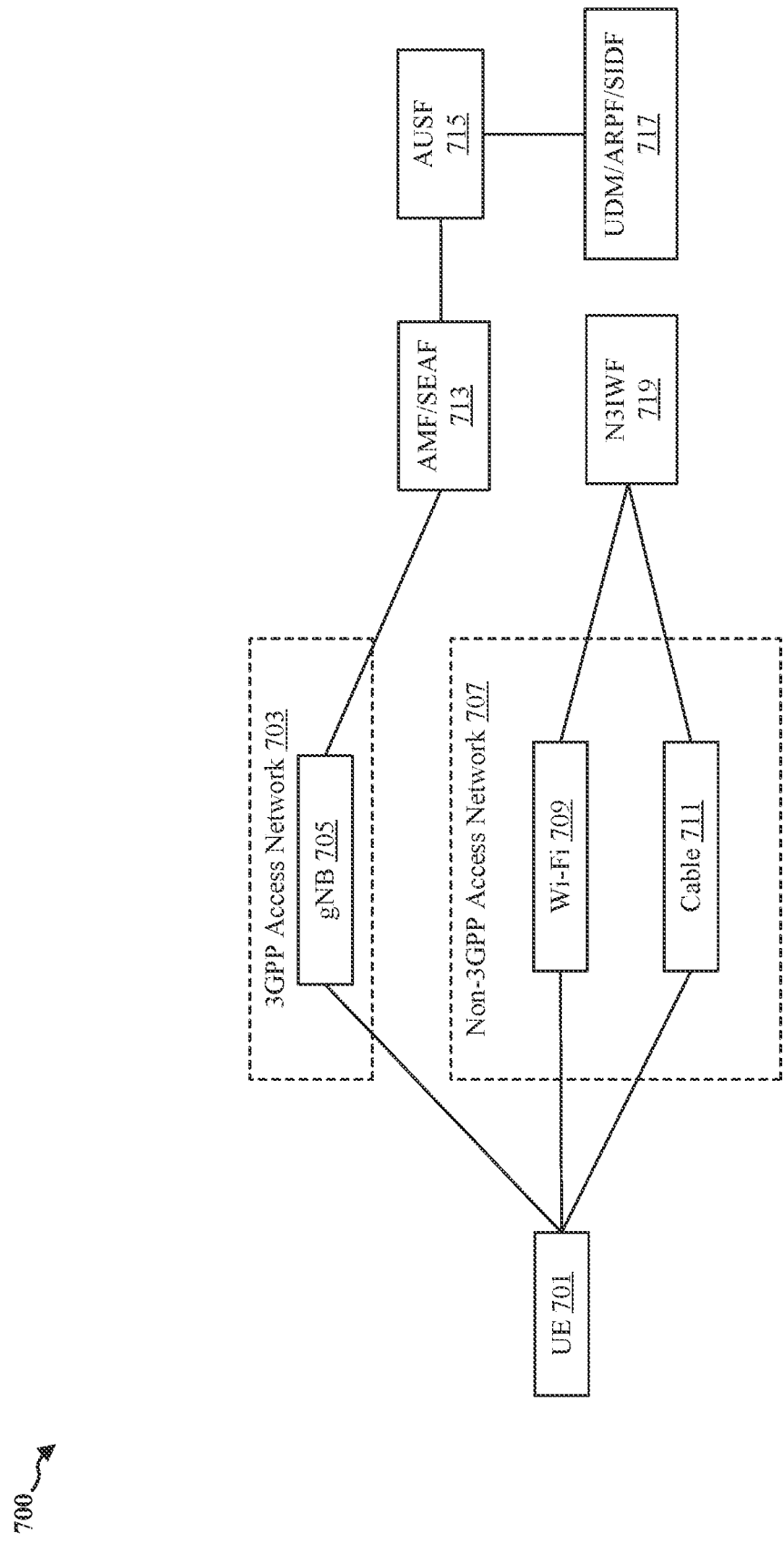
FIG. 7 is a diagram of an 5G Authentication Framework

FIG. 7 is a diagram of an 5G Authentication Framework. Specifically, example 700 from FIG. 7 shows how 5G defines new authentication-related services.

A unified authentication framework has been defined to make 5G authentication both open (e.g., with the support of EAP) and access-network agnostic (e.g., supporting both 3GGP access networks 703 and non-3GPP access networks 707 such as Wi-Fi 709 and cable networks 711).

When EAP (Extensible Authentication Protocol) is used (e.g., EAP-AKA' or EAP-TLS), EAP authentication is between the UE 701 (an EAP peer) and the AUSF 715 (an EAP server) through the Security Anchor Function (SEAF) 713 (functioning as an EAP pass-through authenticator).

When authentication is over untrusted, non-3GPP access networks 707, a new entity, namely the Non-3GPP Interworking Function (N3IWF) 719, is required to function as a VPN server to allow the UE 701 to access the 5G core over untrusted, non-3GPP networks 707 through IPsec (IP Security) tunnels.

Several security contexts can be established with one authentication execution, allowing the UE to move from a 3GPP access network to a non-3GPP network without having to be reauthenticated.

The SEAF 713 is in a serving network and is a "middleman" during the authentication process between a UE 701 and its home network. It can reject an authentication from the UE 701, but it relies on the UE's home network to accept the authentication.

Unified data management (UDM) 717 is an entity that hosts functions related to data management, such as the Authentication Credential Repository and Processing Function (ARPF) 717, which selects an authentication method based on subscriber identity and configured policy and computes the authentication data and keying materials for the AUSF 715 if needed.

The Subscription Identifier De-concealing Function (SIDF) 717 decrypts a Subscription Concealed Identifier (SUCI) to obtain its long-term identity, namely the Subscription Permanent Identifier (SUPI), e.g., the IMSI. In 5G, a subscriber long-term identity is always transmitted over the radio interfaces in an encrypted form. More specifically, a public key-based encryption is used to protect the SUPI. Therefore, only the SIDF has access to the private key associated with a public key distributed to UEs for encrypting their SUPIs.

Figure 8:
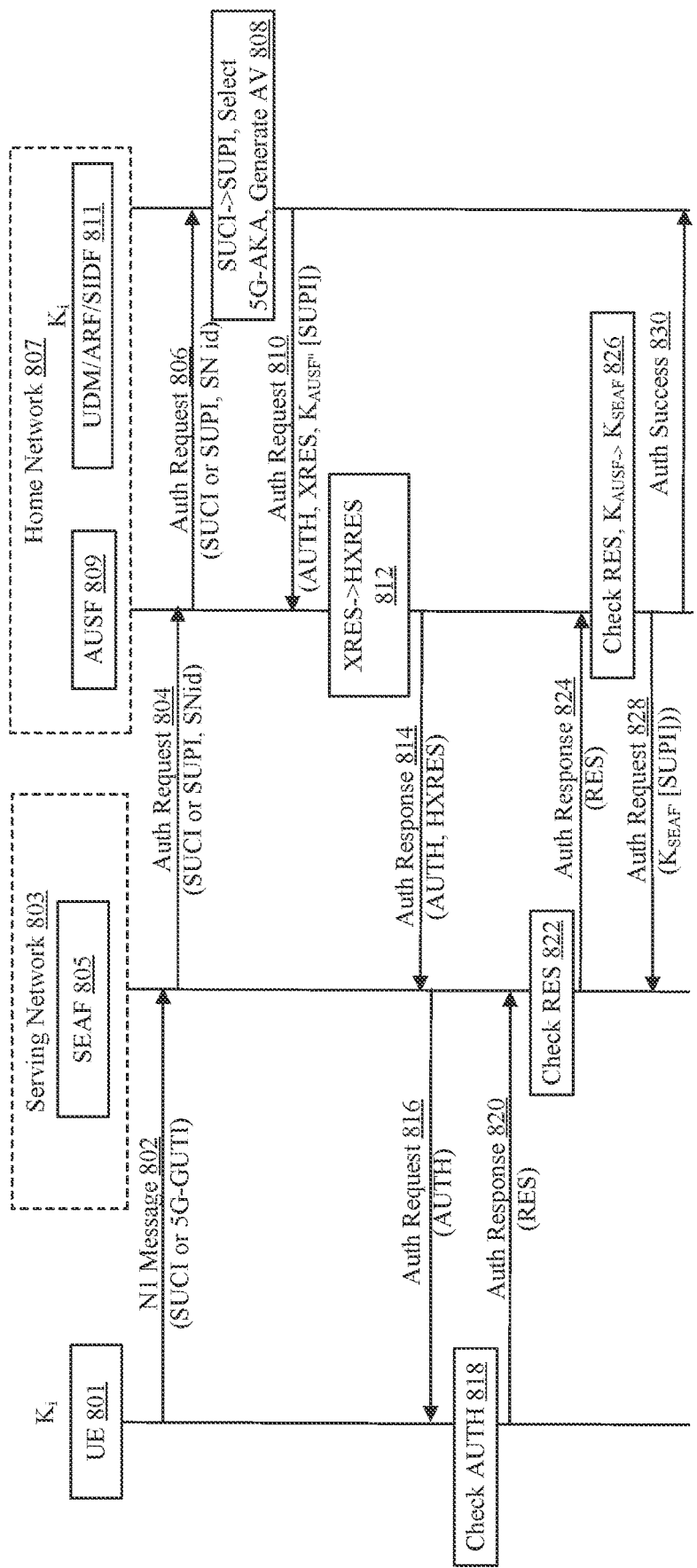
FIG. 8 is a call flow diagram of an example negotiation method between a wireless device and an interrogation system according to an embodiment.

FIG. 8 is a call flow diagram of an example negotiation method between a wireless device and an interrogation system according to an embodiment. Specifically, example 800 from FIG. 8 shows an interrogation process for a wireless device using a 5G authentication process.

For example, the AUSF 809 provides authentication service through Nausf_UEAuthentication, and UDM 811 provides its authentication service through Nudm_UEAuthentication. For simplicity, in example 800 of FIG. 8, generic messages such as Authentication Request and Authentication Responses are used without referring to the actual authentication service names.

In 5G-AKA, the SEAF 805 may start the authentication procedure after receiving any signaling message from the UE 801. At step 802, the UE 801 should send the SEAF 805 a temporary identifier (e.g., 5G-GUTI) or an encrypted permanent identifier (e.g., SUCI) if a 5G-GUTI has not been allocated by a serving network 803 for the UE 801. The SUCI is the encrypted form of the SUPI using the public key of the home network 807. Thus, a UE's permanent identifier (e.g., the IMSI) is never sent in clear text over the radio networks in 5G. This feature is considered a major security improvement over prior generations such as 4G.

At step 804, the SEAF 805 starts authentication by sending an authentication request to the AUSF 809, which first verifies that the serving network 803 requesting the authentication service is authorized.

At step 806, upon success, the AUSF 809 sends an authentication request to UDM/ARPF 811.

At step 808, if a SUCI is provided by the AUSF 809, then the SIDF 811 will be invoked to decrypt the SUCI to obtain the SUPI, which is further used to select the authentication method configured for the subscriber. In this case, it is 5G-AKA, which is selected and to be executed.

At step 810, the UDM/ARPF 811 starts 5G-AKA by sending the authentication response to the AUSF 809 with an authentication vector consisting of an AUTH token, an XRES token, the key KAUSF, and the SUPI if applicable (e.g., when a SUCI is included in the corresponding authentication request), among other data.

At step 812, the AUSF 809 computes a hash of the expected response token (HXRES), stores the KAUSF, and, at step 814, sends the authentication response to the SEAF 805, along with the AUTH token and the HXRES. Note that the SUPI is not sent to the SEAF 805 in this authentication response. It is only sent to the SEAF 805 after UE 801 authentication succeeds.

At step 816, the SEAF 805 stores the HXRES and sends the AUTH token in an authentication request to the UE 801.

At step 818, the UE 801 validates the AUTH token by using the secret key it shares with the home network 807. If validation succeeds, the UE 801 considers the network to be authenticated. The UE 801 continues the authentication by computing and, at step 820, sending the SEAF 805 a RES token, which is validated by the SEAF 805 at step 822.

At step 824, upon success, the RES token is further sent by the SEAF 805 to the AUSF 809 for validation. Note that the AUSF 809, which is in a home network 807, makes the final decision on authentication.

At step 826, if the RES token from the UE 801 is valid, the AUSF 809 computes an anchor key (KSEAF) and, at step 828, sends it to the SEAF 805, along with the SUPI if applicable. At step 830, the AUSF 809 also informs UDM/ARPF of the authentication results so they can log the events, e.g., for the purpose of auditing.

Upon receiving the KSEAF, the SEAF 805 derives the AMF key (KAMF) (and then deletes the KSEAF immediately) and sends the KAMF to the co-located Access and Mobility Management Function (AMF). The AMF will then derive from the KAMF (a) the confidentiality and integrity keys needed to protect signaling messages between the UE and the AMF and (b) another key, KgNB, which is sent to the Next Generation NodeB (gNB) base station for deriving the keys used to protect subsequent communication between the UE and the gNB. Note that the UE has the long-term key, which is the root of the key derivation hierarchy. Thus, the UE can derive all above keys, resulting a shared set of keys between the UE and the network.

Figure 9:
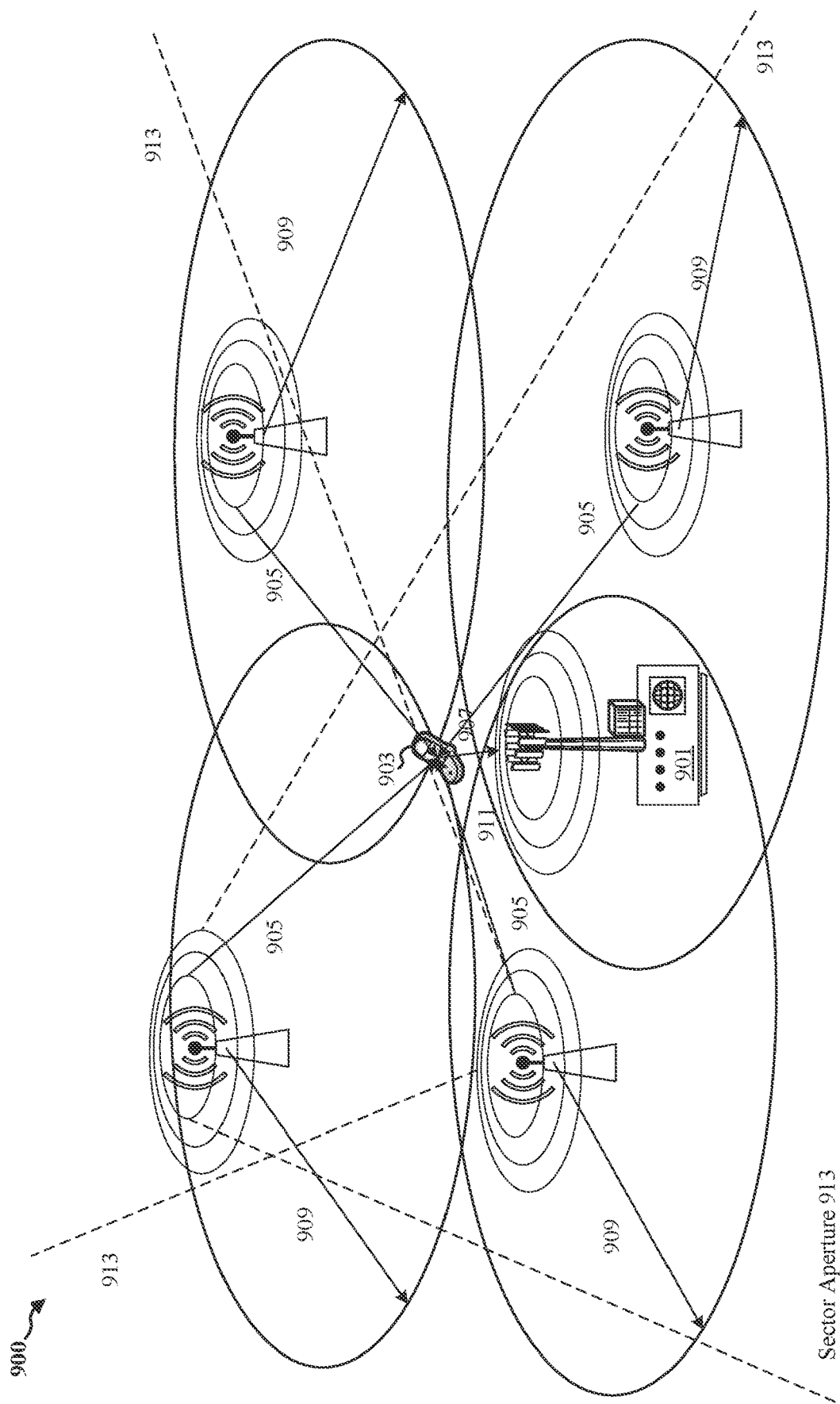
FIG. 9 is a block diagram of an example of interrogating a wireless device using measurement reports transmitted by the wireless device to estimate its location according to an embodiment.

FIG. 9 shows another method of interrogating a wireless device by using measurement reports transmitted by the wireless device 903 to estimate its location.

As shown in example 900 for FIG. 9, the interrogation system 901 (e.g., interrogation system 100 from FIG. 1) may include a receiver that is paired with a beacon that detects a wireless device 903 as it attempts to register with the interrogation system. The interrogation system 901 may utilize a database to store identifying information and/or to consult an authorized device or unauthorized device list. This makes it possible to filter legitimate authorized wireless devices from potential contraband wireless devices that may be of interest and to detect and subsequently locate the potential contraband wireless devices.

Wireless devices that are enticed to register with the interrogation system can be subsequently interrogated if they are suspected to be unauthorized devices. The interrogation system 901 uses a paired interrogation system and receiver to interact with the wireless device 903 as it attempts to register to elicit identifying information such as the mobile identification number (i.e., the wireless device 903 number), the IMSI, TMSI, or serial number. The concept can be extended to entice the wireless device 903 to transmit continuously and possibly be sequestered on a unique channel to facilitate its location.

Once the interrogation system is interacting with a wireless device 903, it is also possible for the interrogation system 901 to compute an approximate location of the wireless device 903. Specifically, the standards specify that a wireless device 903 continually scan all of its neighbors (905), which is also the equivalent of external base station 108 in FIG. 1) while it is actively communicating with a current serving tower and to insert regular measurement reports on the absolute signal strength of the beacons as received by the wireless device 903. This information is then passed on to the network for purposes of determining when a phone should be handed off to another tower. If the wireless device 903 is indicating to the network that it can sense a tower with much better signal strength and/or quality, the network may direct the wireless device 903 to that tower (e.g., mobile assisted hand-off (or hand-over)).

The wireless device 903 may transmit the measurement reports to the baiting beacon (907) of the interrogation system 401. If a user of the interrogation system 901 knows the location of the neighboring towers (presumably from a previous survey), it is possible to derive or at least narrow down the position of the wireless device 903 based on these power measurements. During the period in which the wireless device 903 is collecting data for a measurement report, the interference signals are turned off so that the wireless device 903 can detect the relevant beacons and to prevent the wireless device 903 from monitoring another beacon. Specifically, the received power implies a distance to the tower (909). Therefore, if a circle is drawn around each other, the circle having a radius which is a function of the detected signal strength reported by the wireless device 903, the wireless device 903 will be located at or near the intersection of the circles (911). The location technique may be further refined by using sector orientation and aperture information from the surrounding legitimate beacons. For example, a tower survey may include not just the frequency channel settings and the position of the tower but also the orientation and aperture (beam width) of these sectors mounted thereupon (e.g., pointing with respect to true north and aperture in degrees—typically 120 degrees out of 360 for a three sector tower). The location of the wireless device 903 is therefore refined by overlaying on a map the projections of the sectors that can be heard by the wireless device 903 with the intersection of the sectors being the presumed area in which the device is transmitting (913).

Figure 10A:
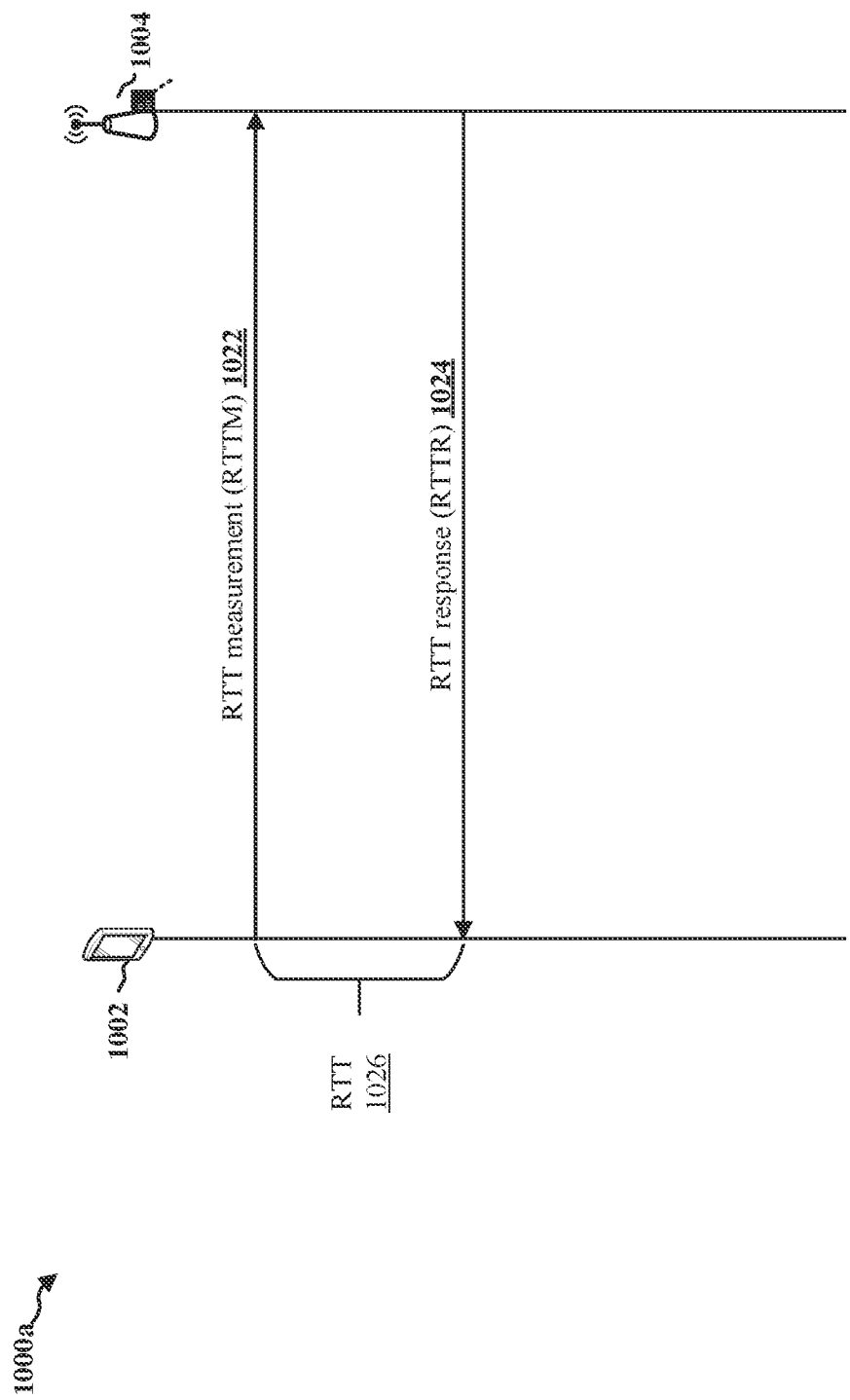
FIG. 10A is a call flow diagram of an example negotiation method between a wireless device and an interrogation system according to an embodiment.

FIG. 10A shows a method of interrogating a wireless device and using round-trip time to estimate its location. Round-trip time (RTT) measures the time it takes for data to leave a starting point and return to the very same point. Generally, RTT is a key metric used to measure network latency, page loading times, and overall quality of a network.

Determining a distance between a UE 1002 and the base station 1004 of the interrogation system may involve exploiting time information of the RF signals. In an aspect, determining the RTT of signals exchanged between the UE and a base station of the interrogation system can be performed and converted to a distance (dk). RTT techniques can measure the time between sending a data packet and receiving a response. These methods may also utilize calibration to remove any processing delays.

Accordingly, a position estimation (or distance) of a UE 1002 can be derived from a round trip time (RTT) 1026 or round-trip delay (RTD). The RTT or RTD is the number of milliseconds it takes for a network request to reach a destination (e.g., a server) and return to its starting point. RTT includes propagation times for the paths between the two communication endpoints (e.g., UE 1002 and a base station 1004 on the interrogation system). As such, an interrogation system may then estimate a location of the UE 1002 by using a round trip time (e.g., a round trip delay time) and measuring the distance a signal has to travel to is destination and return to its starting point.

As shown in example 1000a, the UE 1002 sends a RTT measurement (RTTM) 1022 to the base station 1004 on the interrogation system. The base station 1004 responds by sending a RTT response (RTTR) 1024 back to the UE 1002. The RTT 1026 represents a total flight time of an RTT signal back and forth between the UE 1002 and the base station 1004. The interrogation system may then perform a differential RTT based positioning procedure to determine a position of the UE based on the RTT 1026 associated with the base station 1004.

In some examples, an interrogation system may translate each RTT value into a distance value, for example using a suitable propagation model. The interrogation system then defines around each geographical position of the device a sphere, whose radius is the distance value derived from the RTT measured at that position. The device then finds the intersection of the spheres, which is the desired estimate of the terminal's location.

For example, in UMTS networks, the protocol supports measurement of RTT, which is defined as RTT=TRX−TRX, where TTX denotes the time of the beginning of the transmission of a downlink Dedicate Physical Channel (DPCH), and TRX denotes the time of the beginning of the reception of the corresponding uplink Dedicated Physical Control Channel (DPCCH). RTT measurements typically imply an accuracy of several tens of meters. The RTT measurement may be further refined when adding a bema width of the antenna and azimuth. Moreover, with the use of a second solution, the interrogation system may transmit from two different locations and obtain the intercepting sectors.

A position estimate (e.g., for the UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 10B:
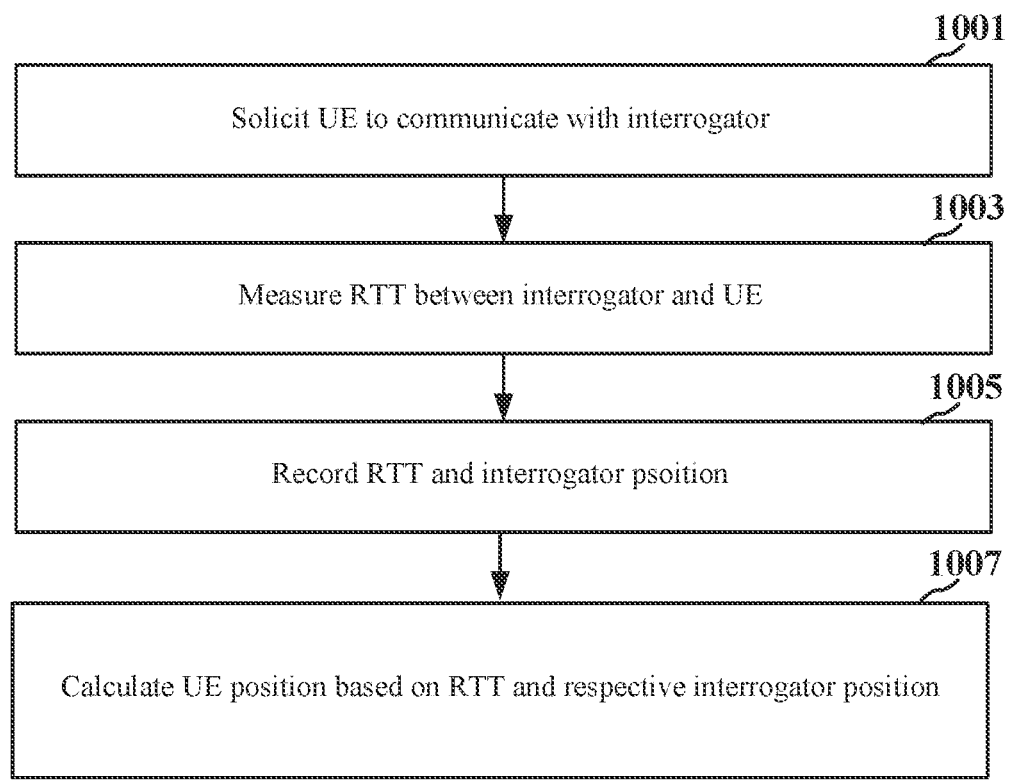
FIG. 10B is a flowchart example of an example negotiation method between a wireless device and the detection device according to an embodiment.

FIG. 10B is a flowchart example of an example method 1000b of locating a UE in accordance according to an embodiment. The method 1000b may be performed by or at a base station (e.g., 304) of an interrogation system 100, another wireless communications apparatus (e.g., the apparatus 1202), or one or more components thereof. According to various different aspects, one or more of the illustrated methods 1000b may be omitted, transposed, and/or contemporaneously performed. The method 1000b begins with interrogation system or device positioned at some initial geographical position within the secured facility. Although the example method 1000b focuses on RTT, any other value indicative of distance between the UE to the interrogation system may be used. The description that follows focuses on RTT, for the sake of clarity.

At operation 1001, the method 1000b may include, a transceiver or base station of the interrogation system soliciting a potential contraband UE to communicate.

At operation 1003, the method 1000b may include, while communicating with the solicited UE, the transceiver or base station extracts the RTT value.

At operation 1005, the method 1000b may include recording the RTT value in association with the position coordinates of the interrogation system.

At operation 1007, the method 1000b may include calculating the location of the UE based on the RTT and corresponding position coordinates of the interrogation system.

Figure 11:
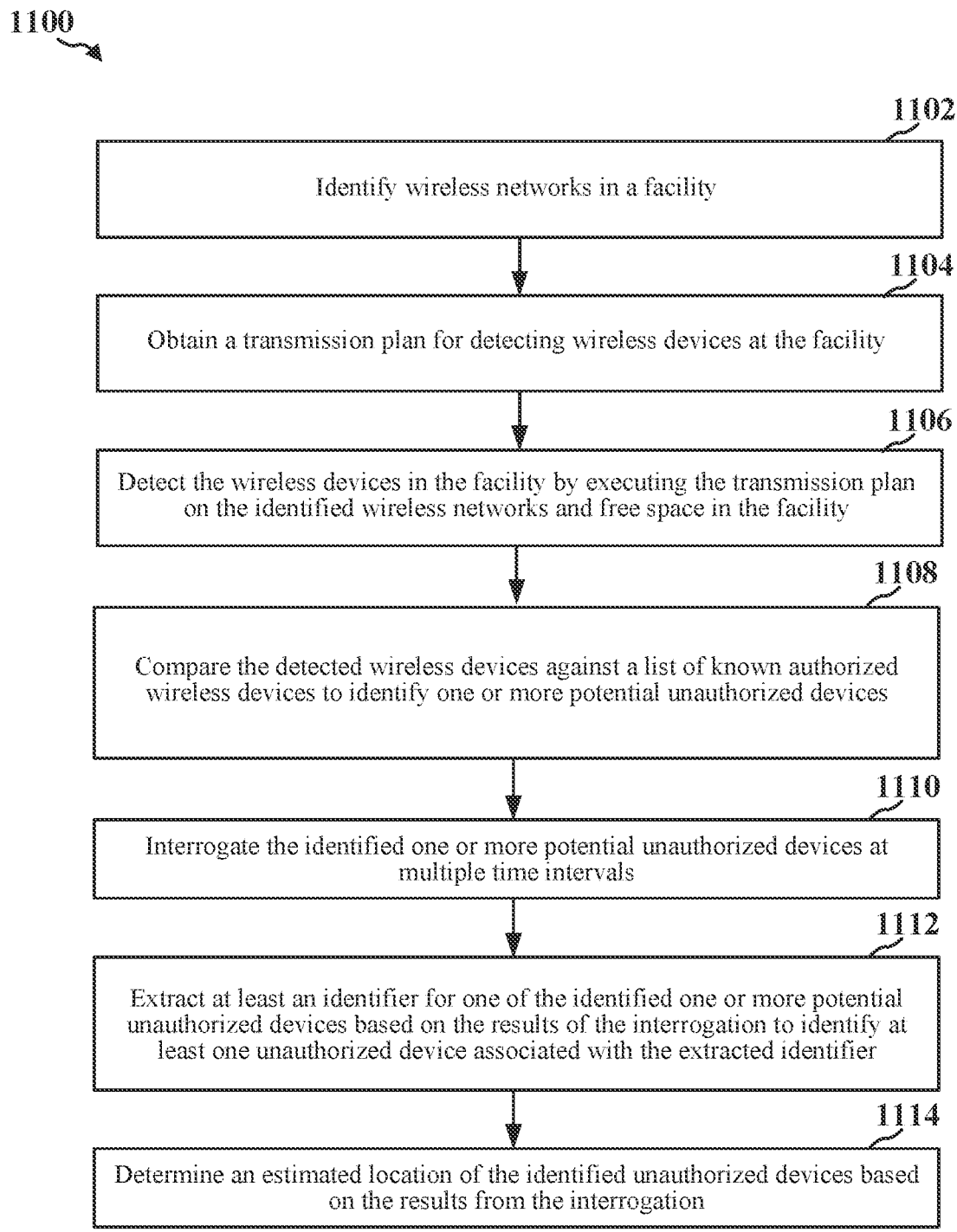
FIG. 11 is flowchart example of an example method of locating unauthorized wireless devices in a facility according to an embodiment.

FIG. 11 is flowchart example of an example method of locating unauthorized wireless devices in a facility according to an embodiment. The method 1100 may be performed by or at a base station (e.g., 304, 504) of an interrogation system (e.g., 100, 401, 501, 601, 801), another wireless communications apparatus (e.g., the apparatus 1202), or one or more components thereof. According to various different aspects, one or more of the illustrated methods 1100 may be omitted, transposed, and/or contemporaneously performed. This method 1100 allows for identifying and locating unauthorized wireless devices through interrogation at a secured facility.

At operation 1102, the method 1100 may include identifying wireless networks in a facility. In some examples, the wireless networks may be identified by performing a radio scan that is able to detect and decode wireless signals.

At operation 1104, the method 1100 may include obtaining a transmission plan for detecting wireless devices at the facility. The transmission plan may comprise transmitting data, using the one or more base stations, on one or more wireless communication protocols, radio technologies, radio bands, or radio frequencies. In some examples, the radio technologies may include at least CDMA/EVDO, GSM, 3G/WCDMA, 4G/LTE, 5G/NR, WiFi satellite, and the like. The point of the transmission plan is to cycle through every RAN and every type of RAT in order to detect wireless devices that may be on every possible frequency, technology, and protocol.

In some examples, the transmission plan may be executed according to a schedule. In some examples, the transmission plan may be executed for a predetermined time period. For example, the transmission plan may be executed for a few hours. As another example, the transmission plan may be executed for a week or a month. In other examples, the transmission plan may be executed for months. In some examples, the transmission plan and settings and parameters for the interrogation may be set or controlled remotely by a user (e.g., contractor).

At operation 1106, the method 1100 may include detecting the wireless devices in the facility by executing the transmission plan on the identified wireless networks and free space in the facility. Free space may correspond to both licensed and unlicensed frequency spectrums.

At operation 1108, the method 1100 may include comparing the detected wireless devices against a list of known authorized wireless devices to identify one or more potential unauthorized devices.

At operation 1110, the method 1100 may include interrogating the identified one or more potential unauthorized devices at multiple time intervals. In some examples, the interrogating may further include transmitting a request to the one or more potential unauthorized devices, and obtaining, from the one or more potential unauthorized devices, at least one reply comprising at least a parameter in response to the request. The location of the identified unauthorized devices relative to the base station may be derived based on information in the reply. The point of the interrogation is to attempt to obtain identifiers and estimated location of wireless devices.

As an example, referring back to FIG. 3, the interrogation may comprise a GPRS attach process. As another example, referring back to FIG. 4, the interrogation may comprise a 3G authentication process. As another example, referring back to FIG. 5, the interrogation process may comprise a LTE authentication procedure. As yet another example, referring back to FIG. 6, the interrogation process may comprise a LTE attach procedure. As yet another example, referring back to FIG. 8, the interrogation process may include a 5G authentication process.

As an example, referring back to FIG. 10B, the UE 1002 transmits a RTT measurement signal 1022 to the base station 1004 and the receives a RTT response 1024 from the base station. The amount of time it takes to obtain the RTT response is the RTT 1026. The base station 1004 may then perform a differential RTT based positioning procedure to determine a position (or distance) of the UE 501 based on the RTT 1026 associated with the base station 1004.

At operation 1112, the method 1100 may include extracting at least an identifier for one of the identified one or more potential unauthorized devices based on the results of the interrogation to identify at least one unauthorized device associated with the extracted identifier.

In some examples, such as in 2G or 3G, the IMEI may be detected. The IMEI is a numeric identifier that is unique for 3GPP mobile phones and some satellite phones. GSM networks use the IMEI number to identify valid devices and stop a stolen phone from accessing the network. In particular, law enforcement and intelligence services may use an IMEI number as input for tracking devices that are then able to locate a mobile phone within an accuracy of a few meters.

In some examples, such as 2G/3G/4G/5G, the IMSI may be detected. IMSI comprises country code, wireless provider code, and phone number of the device. In some examples, an IMSI catcher may force the wireless device to respond with its specific location using GPS or the signal intensities of the wireless device's adjacent cell towers, allowing trilateration based on the known locations of the towers.

In some examples, such as 4G and 5G, extracting at least an identifier for one of the identified one or more potential unauthorized devices may further comprises utilizing a connection to commercial networks.

In some examples, the at least one or more parameters may correspond to at least round-trip time (RTT), servicing cell power level, network management reports (NMRs), measurement reports, observed time difference of arrival (OTDOA), reference signal timing difference (RSTD), chip timing, or propagation delay.

As a first example, referring back to FIGS. 10A-B, RTT is a technique for determining a position of UE. RTT is a two-way messaging technique (base station to UE and base station to UE), with both the UE and the base station reporting their receive-to-transmit (Rx-Tx) time differences to a positioning entity, such as a location server or location management function (LMF), that computes the UE's position. This allows for computing the back and forth flight time between the UE and the base station. The location of the UE is then known to lie on a circle (for two-dimensional positioning) or a sphere (for three-dimensional positioning) with a center at the base station's position. Reporting RTTs with multiple network nodes (e.g., antennas) may allow the interrogation system to solve for the UE's position as the intersection of the circles or spheres.

As another example, referring back to FIG. 4, the interrogation system 401 uses a measurement report in order to determine a location of the UE. As another example, an interrogation system 401 may measure and report the OTDOA between reference RF signals received from two or more network nodes (e.g., different transmission points (e.g., antennas) belonging to a same base station). With OTDOA, when the UE reports the time difference of arrival (TDOA) between RF signals from the two network nodes, the location of the UE is then known to lie on a hyperbola with the locations of the two network nodes as the foci. Measuring TDOAs between multiple pairs of network nodes allows for solving the UE's position as intersections of the hyperbolas.

As yet another example, chip timing may be used by the interrogation system when a message sent by the UE comes back one or two bits early or late and then calculating distance between a UE and the interrogation system.

In another example, propagation delay may be used for UEs operating in 3G (WCDMA), 4G, and for RTT. Propagation delay is the flight time of packets over the transmission link and is limited by the speed of light. With the propagation delay, the interrogation system may estimate the distance between the UE and a serving cell. For example, when a UE sends a "RCC connection message" message, an RRC connection is established between the UE and the serving cell. When the RNC receives this message, it sends another message back to NodeB to set up a Radio Link Setup Request. This message contains the Information Element with the Propagation Delay data (e.g., the delay that has already been checked and adjusted to allow transmission and reception synchronization). Since a Propagation Delay Information Element (IE) is sent every 3 chips, the interrogation system 401 may calculate the distance between the UE and the serving cell based on the WCDMA having a constant rate equal to 3.84 Mcp chip/s and the speed of light being 300,000 km/s.

Other possible parameters or values may comprise Time Advance (TA) values used in GSM networks, or even received signal strength. For example, TA measurements typically imply an accuracy of 500-1000 meters.

In some examples, the method 1100 may include measuring and recording its own location at each position in which the value is measured (or one or more parameters are received). In some examples, the method 1100 may use a Global Positioning System (GPS) receiver and processing system to record the coordinates measured by the GPS receiver for each geographical position in which the value (or one or more parameters) is measured. In some examples, the method 1100 may use a GPS (satellite fix) or assisted GPS (A-GPS) from the commercial towers to measure and records its own location at each position in which the value is measured.

At operation 1114, the method 1100 may include determining an estimated location of the identified unauthorized devices based on the results from the interrogation. In some examples, determining the estimated location of the one or more potential unauthorized devices may further comprises determining, by triangulation, the location of the one or more unauthorized devices based on signals obtained from two or more receivers, wherein each receiver is located at a respective distance from the base station. Further alternatively, the method 1100 may include estimating any other suitable value that is indicative of the distance to the UE.

In some examples, the method 1100 may further include re-interrogating the one or more potential unauthorized devices at the multiple time intervals after the base station is moved to a new location. The purpose of this step is to further re-interrogate the wireless device to obtain more accurate data and identify a pattern of life. For example, if a potential unauthorized device is moving and the potential unauthorized device is moving at a particular time each day, then it is likely possible that the potential unauthorized device belongs to a delivery person who had regular deliveries in the secured facility. As another example, if the potential unauthorized device is located at a same position within the secured facility, then the potential unauthorized device may be a piece of wireless equipment that has cellular capability that the secured facility did not know about. As yet another example, if the potential unauthorized device is only identified during the hours of 9 PM-3 AM and inmates are in their cell during that time, then it is likely that the potential unauthorized device is contraband being used by an inmate.

As an example, the location of the potential contraband wireless devices is tracked by moving the interrogation system 100 through multiple geographical positions. At each geographical position, the interrogation system 100 interrogates the UE and estimates a value that may be indicative of the distance between the UE and the interrogation system 100. In addition, the interrogation system 100 may record its own location coordinates when each value (e.g., the RTT between the UE and the interrogation system 100) is measured, e.g., using a Global Positioning System (GPS) receiver. Thus, by aggregating measurements over multiple locations of the interrogation system 100, the interrogation system 100 is able to locate UEs with high accuracy (e.g., on the order of several meters). At the same time, this performance may be achieved by using only a single interrogation system 100, enabling the location-tracking system to be kept small, low-cost, portable, and inconspicuous.

In some examples, the method 1100 may further include re-interrogating the one or more potential unauthorized devices at the multiple time intervals to obtain more data points on the same wireless device.

In some examples, the method 1100 may further include disabling the one or more unauthorized devices. In some examples, a database can be used for blocking contraband access. As an example, this may include submitting a court order or submitting a disablement request via the FCC's shut off of contraband devices.

In some examples, the method 1100 may further include providing the one or more unauthorized devices to a third party carrier for carrier-level blocking of subsequent wireless transmission to and from the one or more potential unauthorized devices. In some examples, identifying data of the one or more unauthorized devices may be provided to the GSMA to block the devices at the carrier level.

In some examples, the method 1100 may further include creating a file to be uploaded to the GSMA. The file may be in a format that is based on one or more domestic or international standards promulgated by the GSMA or an affiliate agency. For instance, the file may include a plurality of carriers, wherein associated with each identified carrier is one or more unauthorized device (e.g., contraband device) and any other necessary information to enable the GSMA to decipher that the one or more relevant identifiers (ID) of the device(s) at issue should be placed in a database. The GSMA may operate a global IMEI deny list service. The carrier members may share their own so-called black lists (e.g., reported lost or stolen devices, etc.) to a global database in order to identify and block stolen devices across multiple networks or even borders. Other names of the fraudulent database may be used or adopted in the future. For example, a dedicated database may be defined specially for prison contraband devices. The end result, however, will likely be similar or identical as the current use of the stolen database. That file identifying the contraband devices may then be provided to a GSMA stolen file database (e.g., a virtual region in memory, or a region in another, physically separate memory) at the server as a GSMA stolen database file.

In some examples, the method 1100 may further include uploading the GSMA stolen database file to a remote location owned or controlled by the GSMA. This location may be a network link provided to others by the GSMA for uploading related documents. In some arrangements, the upload is an e-mail sent by a user or sent automatically. In still other arrangement, the contractor may provide a secure location with the file uploaded to it, and then may provide the GSMA with a secure link. Other transmission possibilities are possible.

The nomenclature "GSMA stolen database file" may be used when the GSMA instructs that device owners direct such requests (that is, requests related to contraband devices at inmate facilities) to be included in a stolen database. However, in other embodiments, the GSMA may provide other directions. For example, as the representative of domestic and international carriers, the GSMA may create another category of "contraband" telecommunication devices that should be treated by the applicable carrier as such. Thus "GSMA stolen database files" generically refer, for the purposes of this disclosure, to contraband devices whose attempts at remote network access should be thwarted by carriers.

Devices that are identified as contraband based on available data in memory may be deemed by the interrogation system (and by users via the UIs) to constitute contraband devices. The interrogation system (or a user via the UI) may generate a list of these contraband devices, and may perform various undertakings described herein that authorize and validate the devices. One such undertaking is the necessary transfer of ownership of the contraband devices to the contracting entity. The transfer of ownership authorizes the contractor to request the carriers to ban the phone. The devices are validated, and a list of the validated contraband devices may be provided to the Global System for Mobile Communication Association's (GSMA's) database of lost, stolen, or in some embodiments, contraband phones. In some arrangements, the GSMA may delegate or contract out the responsibility for these databases or for other actions to another party. Thus, for purposes of this disclosure, the actions of managing the databases and acting as an intermediary between the carrier and the contractor may be performed by another entity without departing from the scope of the present disclosure.

The information in the database may be used by the carrier as an indicator to a specific gateway to block user access by a contraband device to a remote network, when an attempt is made to use a contraband device. A "remote network" for purposes of this disclosure is any network (e.g., a voice or data network) typically other than one at the correctional facility, in which a contraband device is attempting to access to communicate from within the correctional facility to outside the correctional facility.

In the detection phase, when the contractor is retained to come to the facility for a few hours, days, weeks, or months to collect data, the contractor may gather the necessary data identifying the likelihood or levels of confidence of telecommunication devices of being contracted. The contractor may send a list identifying these devices to the consortium responsible for their network oversight (e.g., the GSMA). The contraband devices' ID information may be provided to a consortium for recording to disable the device on any carrier network which subscribes to the service. The consortium, or a contractor or other designee of the consortium, may maintain one or more databases of different categories of phones or other devices that are no longer authorized subscribers of a carrier network. The carrier network may use an indicator from a consolidated database of lost, stolen, and in some cases contraband devices to determine whether to prevent a device from accessing a remote network. Where an attempt is made to access the remote network by one of these contraband devices, an indicator per received by the carrier (or automatically) to the gateway controlling access to the remote network at issue. The gateway then blocks access to the remote network.

After the data upload is complete, it is assumed that the GSMA stolen database file is in the possession of the GSMA at the GSMA's servers. At some point thereafter, the processing system may receive a GSMA stolen database upload log file, which confirms receipt of same by the GSMA. The upload log also includes an indication to the contractor which of the requests for inclusion (e.g., to the fraudulent database) have been accepted and which, if any, have not. It should be noted that, regardless of which carrier the contraband device is a subscriber on, all carriers should be given the ID of all devices to avoid roaming, for example.

The GSMA, is a non-profit industry organization that represents the interests of mobile network operators worldwide, also includes databases that the GSMA expects compliant carriers to access and to follow the protocols in the applicable standards. For example, a carrier on U.S. soil (e.g., Verizon) may be expected to periodically (or continuously) access a stolen file database of the GSMA and treat the identified devices in that database accordingly. For example, the GSMA may define a process in which the carriers download/cache the file and update it to that carrier's registrars or similar file locations, which may reduce network activity to the GSMA. This review of the relevant database by the carrier is relied on by the correctional facility and contractor alike in preventing access by inmates and other unauthorized users to contraband devices.

Other embodiments may structure the distribution of databases in a different way, or still other embodiments may rely on streaming or file-driven communications to carriers to provide and update relevant data regarding authorized and validated instructions to circumscribe network access in the manner specified. For these reasons, the carrier-level nature of this disclosure is not limited to the embodiments above that rely on databases, but also includes other means of notifying the carriers to prevent remote network access.

Although the embodiments described herein mainly address network monitoring and lawful interception applications in a secured facility, the principles of the present disclosure can also be used in other applications, such as in test equipment for mobile service providers.

Figure 12:
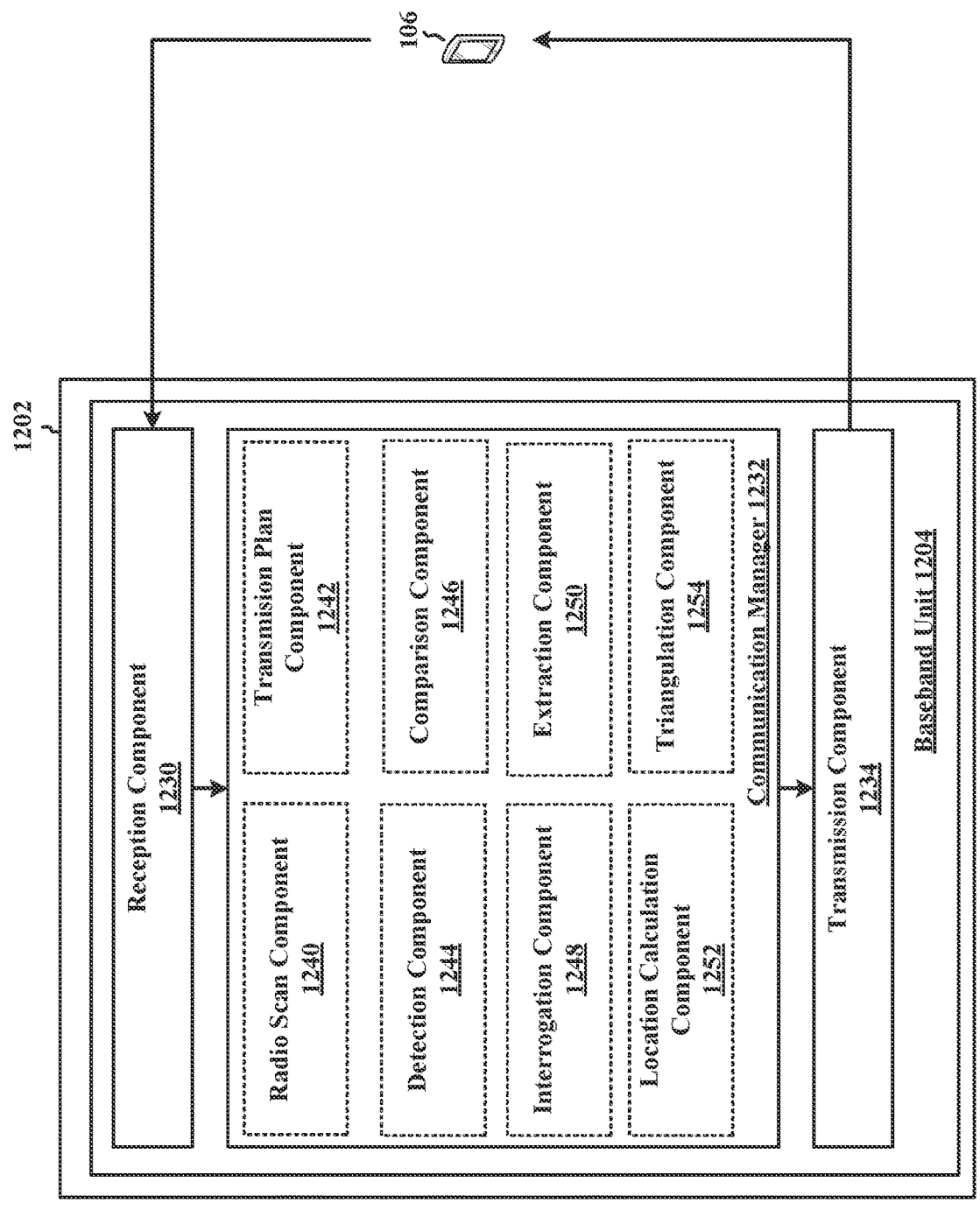
FIG. 12 is a diagram illustrating an example of a hardware implementation for an apparatus according to an embodiment.

FIG. 12 is a diagram 1200 illustrating an example of a hardware implementation for an apparatus 1202. The apparatus 1202 is a base station and includes a baseband unit 1204. The baseband unit 1204 may communicate through a cellular RF transceiver with the UE 106, 112, 114, which may include one or more VUEs and/or PUEs. The baseband unit 1204 may include a computer-readable medium/ memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communications manager 1232, and a transmission component 1234. The communications manager 1232 includes the one or more illustrated components. The components within the communications manager 1232 may be stored in the computer-readable medium/memory and/or configured as hardware within the baseband unit 1204. The baseband unit 1204 may be a component of the system 100 and may include the memory and/or at least one of the TX processor, the RX processor, and the controller/processor.

The communications manager 1232 includes a radio scan component 1240 that is configured to identify wireless networks in a site, e.g., as described in connection with operation 1102 of FIG. 11. The communications manager 1232 also includes a transmission plan component 1242 that is configured to obtain a transmission plan for detecting wireless devices at the site, wherein the transmission plan comprises transmitting data, using a base station, on one or more wireless communication protocols, radio technologies, radio bands, or radio frequencies, e.g., as described in connection with operation 1104 of FIG. 11. The communications manager 1232 also includes a detection component 1244 that is configured to detect the wireless devices in the site by executing the transmission plan on the identified wireless networks and free space in the site, e.g., as described in connection with operation 1106 of FIG. 11. The communications manager 1232 also includes a comparison component 1246 that is configured to compare the detected wireless devices against a list of known authorized wireless devices to identify one or more potential unauthorized devices, e.g., as described in connection with operation 1108 of FIG. 11. The communications manager 1232 also includes an interrogation operation 1248 that is configured to interrogate the identified one or more potential unauthorized devices at multiple time intervals, e.g., as described in connection with operation 1110 of FIG. 11. The communications manager 1232 also includes an extraction component 1250 that is configured to extract at least an identifier for one of the identified one or more potential unauthorized devices based on the results of the interrogation to identify at least one unauthorized device associated with the extracted identifier, e.g., as described in connection with operation 1112 of FIG. 11. The communications manager 1232 also includes an location calculation component 1252 that is configured to determine an estimated location of the identified unauthorized devices based on the results from the interrogation, e.g., as described in connection with operation 1114 of FIG. 11. Optionally, the communications manager 1232 also includes an triangulation component 1254 that is configured to determine, by triangulation, the location of the one or more unauthorized devices based on signals obtained from one or more receivers, wherein each receiver is located at a respective distance from the base station.

The apparatus may include additional components that perform each of the blocks of the algorithm in the aforementioned flowchart and timing diagram of FIGS. 3-11. As such, each block in the aforementioned flowchart and timing diagram of FIGS. 3-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The benefits of the subject matter claimed herein are immediately apparent. One of many advantages is that the secured site or facility no longer has to retain a lifelong contractor (or other company) to maintain a network for detecting contraband. This alone can save the facility significant expenditures. Only a single visit, or a few regular visits, by a contractor over a period of time can suffice to detect and locate contraband over the long term. Further costs savings can be achieved by passing the requirement to block access to the individual carriers, rather than placing the onus of such a task on the facility. No manpower is required (other than deploying the interrogation system) because the interrogation system identifies all wireless networks in the secure site and then sweeps through all different possibilities of frequencies, technologies, and protocols in an area of interest. In addition, the interrogation system may help build a behavior pattern for the wireless devices.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims. Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for locating unauthorized wireless devices at a facility, comprising:
   identifying wireless networks in a facility by performing a radio scan for detecting and decoding wireless signals;
   detecting the wireless devices in the facility by transmitting, using a base station, data to cycle through different wireless communication protocols, radio technologies, radio bands, or radio frequencies on each of the identified wireless networks and free space in the facility;

comparing the detected wireless devices against a list of known authorized wireless devices to identify one or more potential unauthorized devices;

interrogating the identified one or more potential unauthorized devices at multiple time intervals by transmitting a request to the identified one or more potential authorized devices and obtaining, from the one or more potential unauthorized devices, a reply comprising at least one parameter in response to the request;

identifying at least one unauthorized device by extracting at least an identifier for one of the identified one or more potential unauthorized devices based on information from the reply;

determining an estimated location of the at least one unauthorized device based on the information from the reply; and re-interrogating the one or more potential unauthorized devices at the multiple time intervals after the base station is moved to a new location.

2. The method of claim 1, wherein the at least one parameter comprises a round-trip time (RTT) or a round-trip delay (RTD), wherein the estimated location of the identified unauthorized device is determined by transmitting a RTT measurement or a RTD measurement to the base station and obtaining a RTT or a RTD response from the base station.

3. The method of claim 2, wherein the at least one parameter further relates to at least power level, network management reports (NMRs), measurement reports, observed time difference of arrival (OTDOA), reference signal timing difference (RSTD), chip timing, or propagation delay.

4. The method of claim 1, wherein extracting at least an identifier for one of the identified one or more potential unauthorized devices further comprises utilizing a connection to commercial networks.

5. The method of claim 1, wherein determining the estimated location of the one or more potential unauthorized devices further comprises:
determining, by triangulation, the location of the one or more unauthorized devices; and
based on signals obtained from two or more receivers, wherein each receiver is located at a respective distance from the base station.

6. The method of claim 1, wherein the detection of the wireless devices in the facility is executing according to a schedule.

7. The method of claim 1, wherein the detection of the wireless devices in the facility is executed for a predetermined time period.

8. The method of claim 1, further comprising:
disabling the one or more unauthorized devices.

9. The method of claim 1, further comprising:
providing the one or more unauthorized devices to a third party carrier for carrier-level blocking of subsequent wireless transmission to and from the one or more potential unauthorized devices.

10. The method of claim 1, further comprising:
comparing the one or more unauthorized devices against a database of prohibited devices managed by a Global System for Mobile Communication Association (GSMA) or a database of known unauthorized devices.

11. The method of claim 1, wherein the detection of the wireless devices and settings and parameters for the interrogation are configured to be set or controlled remotely by a user.

12. A system for locating unauthorized wireless devices at a facility, comprising:

a memory configured to store identifying data of detected wireless devices;

one or more base stations located in the facility and comprising one or more antennas;

a processing system configured to:
identify wireless networks in a facility by performing a radio scan for detecting and decoding wireless signals;

detect the wireless devices in the facility by transmitting, using a base station, data to cycle through different wireless communication protocols, radio technologies, radio bands, or radio frequencies on each of the identified wireless networks and free space in the facility;

compare the detected wireless devices against a list of known authorized wireless devices to identify one or more potential unauthorized devices;

interrogate the identified one or more potential unauthorized devices at multiple time intervals by transmitting a request to the identified one or more potential authorized devices and obtaining, from the one or more potential unauthorized devices, a reply comprising at least one parameter in response to the request;

identify at least one unauthorized device by extracting at least an identifier for one of the identified one or more potential unauthorized devices based on information from the reply;

determine an estimated location of the at least one unauthorized device based on the information from the reply; and re-interrogating the one or more potential unauthorized devices at the multiple time intervals after the base station is moved to a new location; and a housing that encompasses the memory and the processing system to prevent tampering.

13. The system of claim 12, wherein the at least one parameter comprises a round-trip time (RTT) or a round-trip delay (RTD), wherein the estimated location of the identified unauthorized device is determined by transmitting a RTT measurement or a RTD measurement to the base station and obtaining a RTT or a RTD response from the base station.

14. The system of claim 12, further comprising:
two or more receivers located at a respective distance from the base station, wherein determining the location of the one or more potential unauthorized devices further comprises:
determining, by triangulation, the location of the one or more unauthorized devices based on signals obtained from the two or more receivers.

15. The system of claim 12, wherein the detection of the wireless devices in the facility is executing according to a schedule.

16. The system of claim 12, wherein the one or more antennas are internal antennas located inside the housing.

17. The system of claim 12, wherein the one or more antennas are external antennas located outside of the housing.

18. An apparatus for locating unauthorized wireless devices at a facility, comprising:
a memory configured to store identifying data of authorized and unauthorized wireless devices;
one or more base stations located at a facility and comprising one or more antennas;
a processing system configured to:

identify wireless networks in a facility by performing a radio scan for detecting and decoding wireless signals;

detect the wireless devices in the facility by transmitting, using one or more base stations, data to cycle through different wireless communication protocols, radio technologies, radio bands, or radio frequencies on each of the identified wireless networks and free space in the facility;

compare the detected wireless devices against a list of known authorized wireless devices to identify one or more potential unauthorized devices;

interrogate the identified one or more potential unauthorized devices at multiple time intervals by transmitting a request to the identified one or more potential authorized devices and obtaining, from the one or more potential unauthorized devices, a reply comprising at least one parameter in response to the request;

identify at least one unauthorized device by extracting at least an identifier for one of the identified one or more potential unauthorized devices based on information from the reply; and determine an estimated location of the at least one unauthorized device based on the information from the reply; and re-interrogating the one or more potential unauthorized devices at the multiple time intervals after the base station is moved to a new location; and a housing that encompasses the memory and the processing system to prevent tampering.

\* \* \* \* \*